(12) United States Patent
Chen et al.

(10) Patent No.: US 9,704,187 B2
(45) Date of Patent: *Jul. 11, 2017

(54) COLLABORATIVE ACTIVITIES IN ON-LINE COMMERCE

(71) Applicant: NIKE, Inc., Beaverton, OR (US)

(72) Inventors: Roger D. Chen, Beaverton, OR (US);
Timmy L. Pacholke, Tigard, OR (US);
Stacey J. Pool, Portland, OR (US);
Michael J. Wood, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/987,312

(22) Filed: Jan. 4, 2016

(65) Prior Publication Data
US 2016/0117742 A1 Apr. 28, 2016

Related U.S. Application Data

(63) Continuation of application No. 12/470,338, filed on May 21, 2009, now Pat. No. 9,269,102.

(51) Int. Cl.
*G06F 3/0481* (2013.01)
*G06Q 30/06* (2012.01)
(Continued)

(52) U.S. Cl.
CPC ......... *G06Q 30/0605* (2013.01); *G06Q 10/10* (2013.01); *G06Q 30/0601* (2013.01);
(Continued)

(58) Field of Classification Search
None
See application file for complete search history.

(56) References Cited

U.S. PATENT DOCUMENTS 5,418,945 A * 5/1995 Carter ............... G06F 17/30575
5,504,474 A    4/1996 Libman et al.
(Continued)

FOREIGN PATENT DOCUMENTS

EP    700661 A2    3/1996
EP   1833103 A1    9/2007
(Continued)

OTHER PUBLICATIONS

Apr. 25, 2012—ISR—App. No. PCT/US10/35179.
(Continued)

*Primary Examiner* — Phenuel Salomon
(74) *Attorney, Agent, or Firm* — Banner & Witcoff, Ltd.

(57) ABSTRACT

Computer based systems and methods allow collaborative shopping for and/or designing of (e.g., customization) consumer products, such as articles of footwear, apparel, athletic equipment, etc., by plural users using different computing devices. The users' computing devices may be in communication with one another in various manners, such as over networked connections (e.g., a local area network (LAN), a wide area network (WAN), an internet connection, etc.); via peer-to-peer communications; through a common server or combination of servers that establish a communications link; etc.). The various parties may participate in an on-line or other computer communicative session to create and buy customized products. Additionally, user interfaces for providing these collaborative sessions are described.

18 Claims, 16 Drawing Sheets

(51) Int. Cl.
G06Q 10/10 (2012.01)
G06Q 50/00 (2012.01)
(52) U.S. Cl.
CPC ..... *G06Q 30/0621* (2013.01); *G06Q 30/0641* (2013.01); *G06Q 30/0643* (2013.01); *G06Q 50/01* (2013.01)

(56) References Cited

U.S. PATENT DOCUMENTS

| | | |
|---|---|---|
| 5,732,200 A | 3/1998 | Becker et al. |
| 5,762,241 A | 6/1998 | Cross |
| 5,769,290 A | 6/1998 | Pestana |
| 5,872,924 A | 2/1999 | Nakayama et al. |
| 5,946,274 A | 8/1999 | Yamaguchi et al. |
| 5,966,715 A * | 10/1999 | Sweeney ............... G06F 21/604 |
| 6,013,008 A | 1/2000 | Fukushima |
| 6,138,139 A | 10/2000 | Beck et al. |
| 6,411,965 B2 | 6/2002 | Klug |
| 6,536,941 B1 | 3/2003 | Fang |
| 6,614,451 B1 | 9/2003 | Hudson et al. |
| 6,736,759 B1 | 5/2004 | Stubbs et al. |
| 6,837,827 B1 | 1/2005 | Lee et al. |
| 6,915,287 B1 * | 7/2005 | Felsted ............. G06F 17/30607 |
| 7,016,263 B2 | 3/2006 | Gueissaz et al. |
| 7,057,551 B1 | 6/2006 | Vogt |
| 7,062,722 B1 | 6/2006 | Carlin et al. |
| 7,196,702 B1 | 3/2007 | Lee et al. |
| D545,220 S | 6/2007 | Leung |
| 7,345,954 B2 | 3/2008 | Ehrsam et al. |
| 7,398,151 B1 | 7/2008 | Burrell et al. |
| 7,437,321 B2 | 10/2008 | Hanechak |
| 7,484,183 B2 | 1/2009 | Look et al. |
| 7,510,508 B2 | 3/2009 | Santomassimo et al. |
| 7,529,155 B2 | 5/2009 | Fasciano |
| 7,717,827 B2 | 5/2010 | Kurunmaki et al. |
| 7,771,320 B2 | 8/2010 | Riley et al. |
| 7,789,802 B2 | 9/2010 | Lee et al. |
| 7,828,697 B1 | 11/2010 | Oberrieder et al. |
| 7,843,769 B2 | 11/2010 | Ishida et al. |
| 8,040,758 B1 | 10/2011 | Dickinson |
| 8,088,044 B2 | 1/2012 | Tchao et al. |
| 8,152,693 B2 | 4/2012 | Nurmela et al. |
| 2002/0040332 A1 | 4/2002 | Maari et al. |
| 2002/0055419 A1 | 5/2002 | Hinnebusch |
| 2002/0124005 A1 * | 9/2002 | Matson ............. G06F 17/30893 |
| 2003/0043203 A1 | 3/2003 | Dye et al. |
| 2003/0090530 A1 * | 5/2003 | Ramani ................ G06F 17/50 |
| | | 715/848 |
| 2003/0177187 A1 | 9/2003 | Levine et al. |
| 2004/0081025 A1 | 4/2004 | Chen |
| 2005/0021599 A1 | 1/2005 | Peters |
| 2005/0033515 A1 | 2/2005 | Bozzone |
| 2005/0071242 A1 | 3/2005 | Allen et al. |
| 2005/0091179 A1 * | 4/2005 | Kalthoff .................. G06F 21/62 |
| 2005/0209051 A1 | 9/2005 | Santomassimo et al. |
| 2005/0251462 A1 * | 11/2005 | Nykamp ............... G06Q 10/10 |
| | | 705/26.41 |
| 2006/0041503 A1 | 2/2006 | Blair et al. |
| 2006/0136173 A1 | 6/2006 | Case et al. |
| 2006/0161516 A1 | 7/2006 | Clarke et al. |
| 2006/0247973 A1 | 11/2006 | Mueller et al. |
| 2006/0250418 A1 * | 11/2006 | Chartier ........... G05B 19/41805 |
| | | 345/619 |
| 2007/0033069 A1 | 2/2007 | Rao et al. |
| 2007/0043630 A1 | 2/2007 | Lyden |
| 2007/0091730 A1 | 4/2007 | Ting |
| 2007/0213955 A1 | 9/2007 | Ishida et al. |
| 2007/0246494 A1 | 10/2007 | Kim et al. |
| 2007/0294626 A1 * | 12/2007 | Fletcher ................ H04L 67/38 |
| | | 715/751 |
| 2008/0010867 A1 * | 1/2008 | Davis, III ............ A43B 3/0078 |
| | | 36/136 |
| 2008/0104778 A1 * | 5/2008 | Drake ..................... A43B 5/04 |
| | | 12/146 R |
| 2008/0147219 A1 * | 6/2008 | Jones ................... A43B 1/0054 |
| | | 700/95 |
| 2008/0177641 A1 | 7/2008 | Herniak et al. |
| 2008/0188969 A1 | 8/2008 | O'Malley et al. |
| 2008/0204225 A1 | 8/2008 | Kitchen |
| 2008/0270248 A1 | 10/2008 | Brill |
| 2009/0019648 A1 * | 1/2009 | Jones ................... A43B 1/0027 |
| | | 12/146 R |
| 2009/0047645 A1 | 2/2009 | Dibenedetto et al. |
| 2009/0048070 A1 | 2/2009 | Vincent et al. |
| 2009/0138808 A1 | 5/2009 | Moromisato et al. |
| 2009/0204906 A1 * | 8/2009 | Irving ..................... H04N 7/15 |
| | | 715/753 |
| 2009/0254207 A1 * | 10/2009 | Tiffany ................ A43B 1/0054 |
| | | 700/97 |
| 2009/0280861 A1 | 11/2009 | Khan |
| 2010/0185547 A1 * | 7/2010 | Scholar .................. G06Q 10/06 |
| | | 705/80 |
| 2011/0003665 A1 | 1/2011 | Burton et al. |
| 2011/0281687 A1 | 11/2011 | Gilley et al. |

FOREIGN PATENT DOCUMENTS

| | | |
|---|---|---|
| EP | 2025369 A2 | 2/2009 |
| GB | 2424084 A | 9/2006 |
| JP | 04-184528 | 7/1992 |
| JP | 08-305663 | 11/1996 |
| JP | H11-178798 A | 7/1999 |
| JP | 2000300711 A | 10/2000 |
| JP | 2001289975 A | 10/2001 |
| JP | 2002022859 A | 1/2002 |
| JP | 2002507734 A | 3/2002 |
| JP | 2002-109301 | 4/2002 |
| JP | 2002300632 A | 10/2002 |
| JP | 2002306660 A | 10/2002 |
| JP | 2003-122960 | 4/2003 |
| JP | 2003236028 A | 8/2003 |
| JP | 2003-296615 | 10/2003 |
| JP | A2003296613 A | 10/2003 |
| JP | 2004-118274 | 4/2004 |
| JP | 2006058806 A | 3/2006 |
| JP | 2007-514235 | 5/2007 |
| JP | 2007-267996 | 10/2007 |
| JP | 2008524589 A | 7/2008 |
| JP | 2009050699 A | 3/2009 |
| JP | 2009-078134 A | 4/2009 |
| KR | 10-1998-0022317 | 6/1998 |
| KR | 19980022317 U | 7/1998 |
| KR | 2003-0039970 A | 5/2003 |
| KR | 1020030039970 A | 5/2003 |
| KR | 10-0724887 B1 | 5/2007 |
| KR | 10-2008-0022680 | 3/2008 |
| KR | 10-2009-0029695 | 3/2009 |
| WO | 02097705 | 12/2002 |
| WO | 2004100059 A2 | 11/2004 |
| WO | 2005/062158 | 7/2005 |
| WO | 2006065679 A2 | 6/2006 |
| WO | 2007135389 A1 | 11/2007 |
| WO | 2008050590 A1 | 5/2008 |
| WO | 2008056524 A1 | 5/2008 |
| WO | 2008101085 A2 | 8/2008 |
| WO | 2009030484 A1 | 3/2009 |
| WO | 2009033034 A1 | 3/2009 |
| WO | 2009124193 A1 | 10/2009 |

OTHER PUBLICATIONS

Feb. 26, 2014—Extended European Search Report—App. No. 10726358.4.
Garmin: "Forerunner 405CX owner's manual" [online] Mar. 2009, Retrieved from the Internet: URL:http://www8.garmin.com/manuals/Forerunner405CX_OwnersManual.pdf, retrieved Jul. 7, 2010.
Garmin: "Foot Pod" [online] Oct. 2008, Retrieved from the Internet: URL: http:f/wwwB.garmin.com/manuals/FootPod_Instructions_Multilingual_.pdf, retrieved Jul. 7, 2010.
Oct. 1, 2010—(WO) Search Report and Written Opinion—App. No. PCT/US2010/032381.

(56) References Cited

OTHER PUBLICATIONS

Jul. 16, 2010—(WO) International Search Report—App. No. PCT/US2010/032391.
Polar Electro Oy: "Polar RS200 User Manual" Company website. 2005, XP002585994, retrieved from the Internet:2URL:http:f/support.polar.fi/gip/PKBStoGIP.nsf/
4eb122f6011156bec22573e0003779ed/
c225742500419a8ac225702D  e004619aa/$FILE/Polar_RS200_user_manuai_English.pdf [retrieved on Jul. 5, 2010].
Jul. 14, 2010—(WO) Search Report and Written Opinion—App. No. PCT/US2010/032401.
Jun. 11, 2013—(WO) ISR and WO—App. No. PCT/US2012/071700.
Aug. 7, 2013—(WO) ISR and WO—App. No. PCT/US2013/027262.
European Patent Application No. 10726358.4 Extended European Search Report dated Feb. 26, 2014.

\* cited by examiner

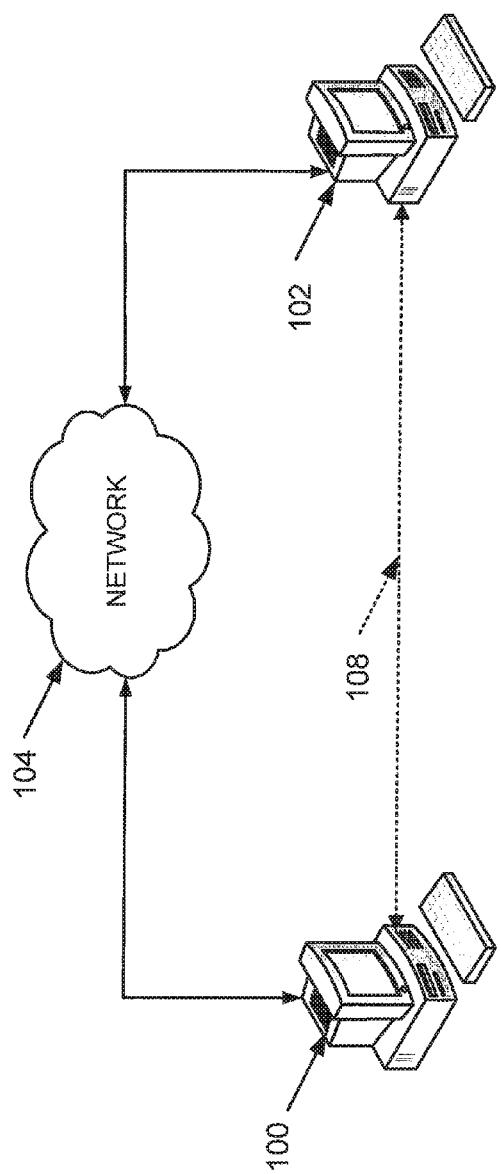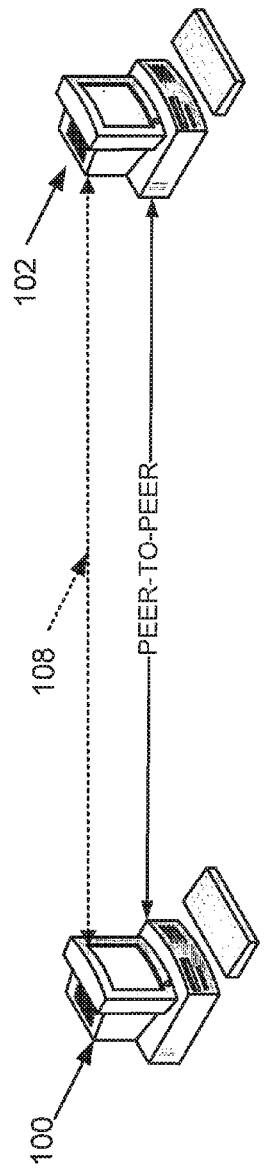

COLLABORATIVE ACTIVITIES IN ON-LINE COMMERCE

CROSS-REFERENCE TO RELATED APPLICATIONS

This application claims the benefit of and priority to U.S. patent application Ser. No. 12/470,338, entitled "COLLABORATIVE ACTIVITIES IN ON-LINE COMMERCE," filed May 21, 2009, which is expressly incorporated herein by reference in its entirety for any and all non-limiting purposes.

FIELD OF THE INVENTION

The present invention relates to systems, methods, and computer generated user interfaces for collaborative shopping for and/or designing of (e.g., customization of) consumer products, such as articles of footwear, articles of apparel, athletic equipment (e.g., bags, gloves, watches, socks, uniforms, protective equipment, pads, team gear, etc.).

BACKGROUND OF THE INVENTION

Recent years have ushered in dramatic advancements in electronic computing devices and their capabilities, including dramatic advances in the information readily available to such devices (e.g., over the internet or other networked connections) and communications capabilities between such devices. The present invention takes advantage of these technological advances and in on-line commerce field.

BRIEF SUMMARY OF THE INVENTION

Various aspects of this invention relate to systems and methods for collaborative shopping for and/or designing of (e.g., customization of) consumer products, such as articles of footwear, by plural users using different computing devices, optionally at different locations (e.g., over a networked connection, such as a local area network (LAN), a wide area network (WAN), an internet connection, etc.; via peer-to-peer communications; through a common server or combination of servers that establish a communications link between users; etc.). The various parties may participate in an on-line or other computer communicative session to create and buy customized products.

Additional aspects of this invention relate to user interfaces provided on computing devices that allow users to collaboratively design and/or shop for consumer products, such as articles of footwear. Each party's computing device may generate a user interface that displays a rendering of the product being designed as the design is being made. The user interfaces are generated by computer readable media including computer executable instructions stored thereon for generating a desired user interface on a display device, wherein the computer executable instructions provide systems and methods and accept multiple users' input for collaborative product (e.g., footwear) design or shopping sessions.

While described above in conjunction with articles of footwear, aspects of this invention also may be practiced in conjunction with design of and/or shopping for other products, such as apparel (including athletic apparel, uniforms, etc.) and athletic equipment (such as balls, bats, gloves, bags, protective equipment, team gear, pads, hockey sticks, watches, socks, etc.).

BRIEF DESCRIPTION OF THE DRAWINGS

The above-noted and other features and aspects of the invention will become more apparent from the following detailed description, when considered in conjunction with the appended drawings, wherein:

FIGS. 1A through 1C illustrate various examples of hardware and overall networking systems that may be used to implement various examples of the invention;

FIG. 14 illustrates an example user interface screen receiving an invitation to an on-line collaborative shopping session in accordance with examples of this invention.

DETAILED DESCRIPTION OF THE INVENTION

Figure 1A:
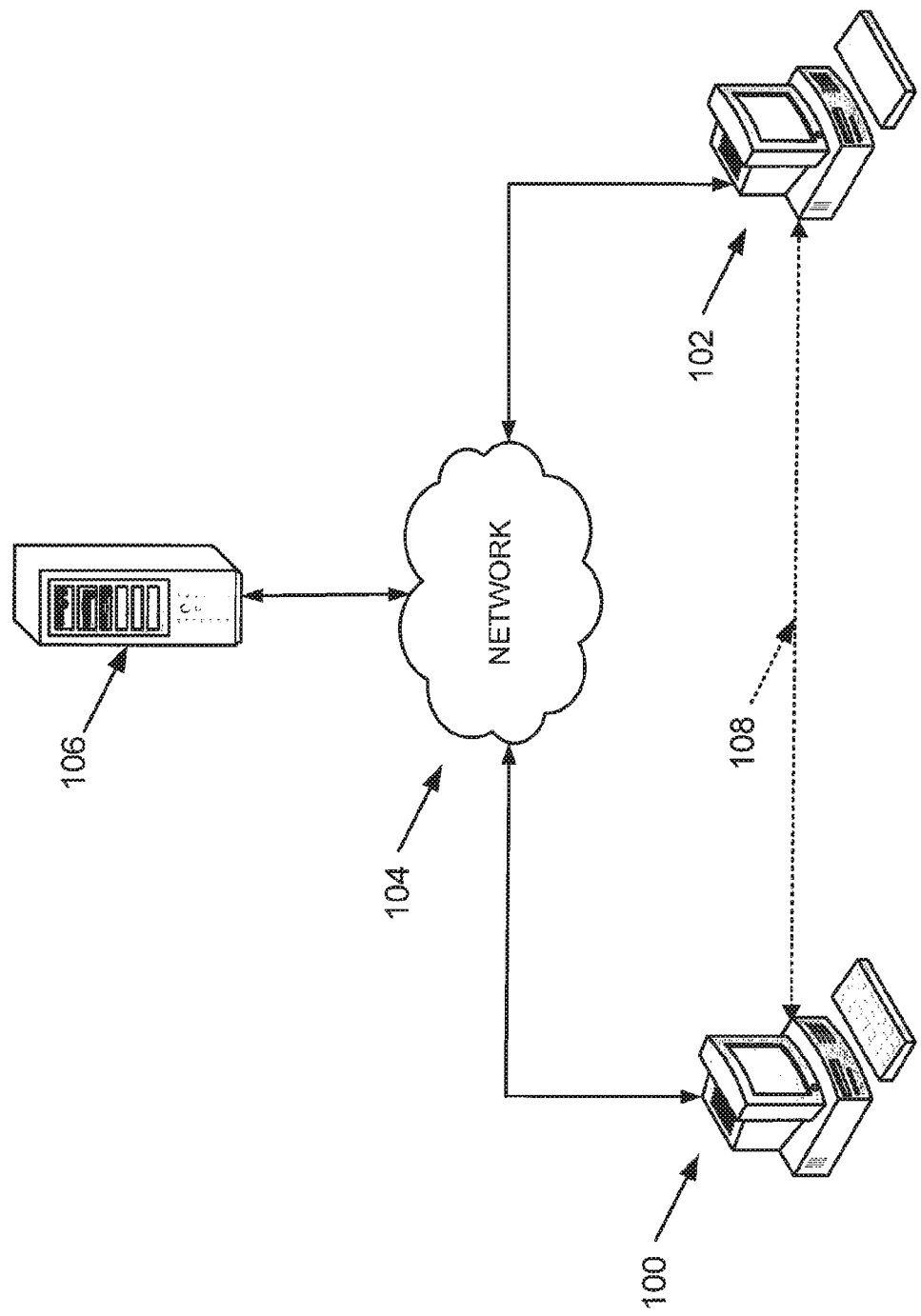

I. General Description of Collaborative Design Systems and Methods According to Examples of this Invention In general, as described above, some aspects of this invention relate to systems and methods for collaborative designing of consumer products, such as articles of footwear, apparel, and/or athletic equipment, by plural users using different computing devices, optionally at different locations (e.g., over a networked connection, such as a local area network (LAN), a wide area network (WAN), an internet connection, etc.; via peer-to-peer communications; through a common server or combination of servers that establish a communications link between at least a first user and a second user; etc.). As some more specific examples, systems for collaborative designing of footwear by plural users may include: (a) a first computing system including a display device capable of presenting a first user interface to a first user; (b) an output system for sending data to enable a second user (on a separate, optionally remotely located, computing device) to join a collaborative design session with the first user; (c) a first input system for receiving a selection of a base article of footwear from either the first user or the second user; and (d) a processing system programmed and adapted to receive footwear design input generated by the first user and the second user and to modify an appearance of the base article of footwear on the display device using the footwear design input generated by the first user and the second user. Additionally, systems in accordance with at least some examples of this invention further may include means for communicating between at least the first user and the second user, which means may include a text message display (optionally including the text of incoming and/or outgoing text messages between at least the first user and the second user), a video feed of the second user (e.g., from a webcam), a picture of the second user, audio output generated by the second user, etc. Any desired number of parties may collaborate on a footwear design (or other product design) without departing from this invention.

Systems according to this invention may allow only one of the collaborating users to control the footwear design input at a given time, or optionally, if desired, input from more than one user may be received at a time. Some manner of identifying the user in control of the input may be provided in the user interface generated by systems according to this invention (e.g., by color coded cursors, pointers, or selector elements; by icons or textual information located near or included with cursors, pointers, or selector elements; by textual information in a display element; etc.).

Any desired type of footwear design data may be controlled, altered, or customized by the various collaborating users of systems and methods according to this invention, such as: a color of a portion of the article of footwear (e.g., the various upper portions or elements, the various midsole portions or elements, the various outsole portions or elements, etc.); pictorial or other graphical data that may be printed or otherwise provided on the shoe, including the picture or graphical data itself (i.e., so the picture or graphic can be generated), as well as data identifying the desired location for the picture or graphic on the shoe, the picture or graphic size, the picture or graphic orientation, etc.; logo data that may be provided on the shoe (e.g., the footwear manufacturer's logo, a team or group logo, etc.), including the logo data itself (i.e., so the logo can be generated), as well as data identifying the desired logo location on the shoe, the desired logo size, the desired logo color(s), the desired logo orientation, etc.; textual data that may be provided on the shoe, including the textual data itself (i.e., so the text can be generated), as well as data identifying the desired text location, the desired text size, the desired text color, the desired text orientation, the text font, etc. If desired, systems and methods according to at least some examples of this invention further may allow any of the collaborating users to select from a variety of materials or other characteristics for various portions of the article of footwear, such as different upper material(s); midsole material(s); outsole material(s); upper thickness(es); midsole thickness(es); outsole thickness(es); midsole stiffness characteristics (such as the stiffness of foam, fluid-filled bladders, or other materials making up the midsole); outsole tread patterns; arch support characteristics; impact-attenuation characteristics; size, orientation, and/or location of openings or windows in the outsole, midsole, and/or upper; patterns of openings provided in the outsole, midsole, and/or uppers; laser cutting designs and/or characteristics; laser etching designs and/or characteristics; etc.

As noted above, in collaborative design systems and methods according to examples of this invention, each user may be operating a different computing device (such as a personal computer, laptop, workstation, palmtop, cellular telephone, personal digital assistant, etc.). If desired, each user will see the same or substantially the same rendering of the user interface on his/her computing device, including the same or substantially the same appearance of the article of footwear on the various computing devices at any given time (while allowing sufficient time for data transfer between the various computing devices involved in the session). The sizes of the renderings and/or the content of the interface (and/or its functionality) on the different devices may vary somewhat, but the article of footwear being designed may have the same general appearance on each device involved in the session (e.g., same colors, same orientation, same views, etc.). Alternatively, each user may separately control his or her own view (optionally with a way to get one user's view to automatically or "on command" match one or more of the other user's views) so that each may look at and/or design on any desired portion of the shoe at any time.

The user interface on one user's computer (e.g., the session initiator) may differ from that available on other users' computers (e.g., the invitees). For example, if desired, the "first user" (e.g., the person for whom the design is being created or the person who ultimately controls the design) may have more or different features available at his or her control as compared to other users, such as: individual user lock out features; user input control features (to control which user is generating the input to change the design); product purchase capabilities; new or additional user invitation capabilities (to invite additional or new people to the collaboration session); collaborator drop capabilities (to forcefully drop one or more collaborators from the session); save capabilities; rejection capabilities (to reject a design suggestion made by any user); design sharing capabilities; etc. This user also may control which designs may be saved and/or shared with other users, as well as the extent to which a design may be made available to other users (e.g., share with anyone, share with one or more groups or individuals, share with no one, etc.).

Collaborative design methods in accordance with at least some examples of this invention may include: (a) displaying a first user interface on a display device of a first computing system to a first user; (b) generating an output that includes data to enable a second user to join a collaborative design session with the first user; (c) receiving input indicating a selection of a base article of footwear from either the first user or the second user; (d) receiving footwear design input generated by the first user and the second user; and (e) modifying an appearance of the base article of footwear on the display device using the footwear design input generated by the first user and the second user. Methods according to examples of this invention further may include steps that allow use of any of the features, steps, or functionality described above (or those described in more detail below). Still additional aspects of this invention relate to computer readable media including computer executable instructions stored thereon for performing the above-noted methods (and those described in more detail below).

While described above in conjunction with design of and/or shopping for articles of footwear, aspects of this invention also may be used for design of and/or shopping for other consumer products, such as articles of apparel, athletic equipment, etc.

II. General Description of Collaborative Shopping Systems and Methods According to Examples of this Invention Systems and methods according to additional aspects of this invention relate to collaborative shopping for consumer products, such as articles of footwear. As some more specific examples, systems in accordance with at least some examples of this aspect of the invention may include: (a) a first computing system including a display device capable of presenting a first user interface to a first user; (b) an output system for sending data to enable a second user to join a collaborative shopping session with the first user; (c) a first input system for receiving footwear selection input from at least one of the first user or the second user, the footwear selection input for displaying a selection of one or more articles of footwear for potential purchase; and (d) a processing system programmed and adapted to receive footwear shopping input generated by the first user and the second user and to modify a display of the selection of articles of footwear on the display device using the footwear shopping input generated by the first user and the second user. Systems in accordance with examples of this invention further may include means for communicating between the first user and the second user, e.g., of the various types described above relating to the collaborative designing aspects of this invention, as well as any other features and functionality desired from the collaborative designing systems described above (and described in more detail below).

Collaborative shopping methods in accordance with at least some examples of this invention may include, for example: (a) displaying a first user interface on a display device of a first computing system to a first user; (b) generating an output that includes data to enable a second user to join a collaborative shopping session with the first user; (c) receiving footwear selection input from at least one of the first user or the second user, the footwear selection input used for creating a display on the first user interface including a selection of one or more articles of footwear for potential purchase; (d) receiving footwear shopping input generated by the first user and the second user; and (e) modifying the display of the selection of articles of footwear on the first user interface using the footwear shopping input generated by the first user and the second user. Methods according to examples of this invention further may include steps that allow use of any of the features, steps, or functionality described above (or those described in more detail below). Still additional aspects of this invention relate to computer readable media including computer executable instructions stored thereon for performing the above-noted methods (and those described in more detail below).

III. General Description of User Interface Features in Accordance with Examples of this Invention Additional aspects of this invention relate to user interfaces provided on computing devices that allow users to collaboratively design and/or shop for articles of footwear (or other consumer products). The user interfaces may include elements and features that allow use and/or activation of any of the features and/or functionality described above and/or any of the features and/or functionality described in more detail below.

As some more specific examples, aspects of this invention relate to computer readable media including computer executable instructions stored thereon for generating a user interface for a collaborative footwear design session on a computer controlled display device. This user interface may include, for example: (a) a first display portion including at least one rendering of an article of footwear; (b) one or more selector elements (such as a pointer or cursor) that allow at least one of a first user and a second user to select a portion of the article of footwear; (c) an indicator indicating which user is in control of an individual selector element (such as text, icons, pictures, animations, etc.); and (d) a first element for producing a change in an appearance of the rendering of the article of footwear in the first display portion based on input generated by the first user and the second user. The first element (or at least some element of the interface) may include features like a color palette or color menu that allows users to change a color of a selected portion of the article of footwear; one or more orientation elements that allow users to change an orientation of the article of footwear as rendered in the first display portion; one way, two way, or multi-way user communication elements or features (such as textual input and display panel(s), instant messaging capabilities, audio and/or video communication capabilities, etc.); etc. The user interface further may include an input portion through which the first user can input data used to set up the collaborative footwear design and/or shopping session with the second user (or another user).

Given this general background and information, more detailed information regarding specific examples of systems, methods, computer-readable media, and user interfaces in accordance with this invention will be described in more detail below. It should be understood that this more detailed description relates to various specific examples of the invention and their features and functionality, and this description should not be construed as limiting the invention.

IV. Detailed Description of Specific Example Collaborative Design and/or Shopping Systems, Methods, and User Interfaces According to this Invention

A. Example Hardware Features

FIGS. 1A through 1C illustrate various examples of hardware systems on which systems and user interfaces according to this invention may be implemented and on which methods according to this invention may be practiced. FIG. 1A shows a first computing device 100 and a second computing device 102 connected and in communication with one another via a network 104, such as via an internet connection, via a local area network (LAN), via a wide area network (WAN), etc. The two computing devices 100 and 102 may be located remotely from one another. As shown in FIG. 1A, the two computing devices 100 and 102 each establish a communication channel within the network 104 and communicate with a messaging server system 106 (comprising one or more server computers) that provide at least shared collaboration data used to change the design (as will be described in more detail below) between the computing devices 100 and 102. Any desired communication link and communication protocol may be used to provide and control the data exchange between computing devices 100 and 102. If desired, this same server system 106 may provide communication data between the users on the computing devices 100 and 102 (such as textual message data, webcam data, etc.) as will be described in more detail below. Alternatively, if desired, a separate communication link 108 may be provided to support transfer of communication data between the computing devices 100 and 102.

Any desired types of computing devices 100 and 102 may be used without departing from this invention, such as any computing device capable of establishing a networked connection and/or a peer-to-peer connection and capable of providing the necessary display, user interface, and input capabilities, as will be described in more detail below. Some more specific examples of computing devices 100 and 102 that may be used in systems and methods in accordance with at least some examples of this invention include, but are not limited to: desktop computers, personal computers, laptop computers, palmtop computers, handheld computers, cellular telephones, personal digital assistants, computer workstations, televisions, and the like. Notably, collaborative design and/or shopping sessions in accordance with examples of this invention may include any desired number of collaborators (e.g., any desired number of communicating computing devices 100, 102), and the various computing devices 100, 102, etc. may be in communication with the network 104 and the server system 106 in the same or different manners without departing from this invention. Moreover, the communicating computing devices 100, 102, etc. in a given collaboration session may be the same type or different types without departing from this invention (such as one desktop computer and one cellular telephone device), and the computing devices 100, 102, etc. may join in the collaborative session via the same communication channels or via different communication channels (e.g., both users may join the session through a common website portal (such as NIKEiD.com), or through different website portals (such as one user through NIKEiD.com and another user through a NIKEiD Facebook application, etc.).

Computing devices 100 and 102 that may be used in systems and methods in accordance with examples of this invention may include one or more input devices and a data processing system (e.g., including one or more microprocessors). Examples of input devices that may be included with computing devices 100, 102 include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, any desired type of display device may be provided for use in conjunction with the computing devices 100, 102 of systems and methods according to this invention, including display devices integrated with the computing device 100, 102 itself or display devices separate from the computing devices 100, 102 but in communication therewith, such as projector displays, separate monitor displays, etc.

The computing devices 100 and 102 may be connected to the network 104 in any desired manner without departing from this invention, including in conventional manners that are known and used in the art, such as any conventional wired or wireless connection and using any network connection protocol. The communication channel connection 108 between the computing devices 100, 102 may be the same as or different from the collaborative data exchange connections without departing from this invention, and this connection 108 may include technology that is conventional and known in the art. In addition to various computer-to-computer communication links that are known and used in the art for providing live, real time communications between two (or more) computers, the communication channel connection 108 further may include other types of communication channels between computers or users, such as an instant messaging channel, a peer-to-peer messaging channel, a conventional telephone connection (which may use different hardware from that involved in inputting and exchanging the collaboration data), etc. As another alternative, if desired, the users could be located in close proximity to one another and may be allowed to communicate directly, in a face-to-face conversation, without the need for a separate communication channel. The communication channel 108, when provided, may use all of the same hardware as involved in the collaborative data exchange, all different hardware, or a combination thereof (e.g., some users using the same hardware, others using different hardware, etc.).

As described above (and as will be described in more detail below), systems and methods in accordance with examples of this invention will provide a user interface display on the user's computing device 100, 102. This interface will allow the user to see the subject matter of the collaborative effort and will allow the user to introduce his/her input to the collaborative effort. The user interfaces on the various devices will be provided and controlled by one or more of the computing devices 100, 102 and/or by the server system 106, and data for generating, maintaining, and receiving input through the user interfaces will be generated and provided via computer readable media included as part of or associated with one or more of the computing devices 100, 102 and/or the server system 106. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

In the example overall system shown in FIG. 1A, the software for generating the user interface may reside on computer readable media present on or available to any one of computing device 100, computing device 102, or server system 106. Alternatively, if desired, the software, or at least some portion(s) thereof, may be reside on more than one of, or all of computing device 100, computing device 102 (as well as any other computing device included in a collaboration session), or server system 106. The sever system 106 may be operated and maintained by the same organization(s) or individual(s) that operate and maintain at least one of the computing devices 100 and 102 and/or network 104, or the server system 106 may be operated, controlled, and maintained by a party separate from any or all of these entities. As some more specific examples, server system 106 may be operated and maintained (and the user interface software also may be operated and maintained) by one or more entities whose products are being marketed through the collaborative designing and/or shopping systems and methods described below (e.g., a manufacturer, a retailer, a vendor selected by a manufacturer or retailer, etc.).

Another example overall collaborative system set up is illustrated in FIG. 1B. While the overall network features 104 may be the same as or similar to those described above in conjunction with FIG. 1A (e.g., LAN, WAN, internet, etc.), in this example set up, the separate and independent server system 106 is omitted. Rather, in the set up of FIG. 1B, at least one of the two computing devices 100, 102 (and optionally both computing devices 100, 102) drives the collaborative data exchange communications and includes the software for generating and controlling the user interface. Also, if desired, one of the computing devices 100, 102 (or others) in the collaborative session may be designated as the "leader," which will then act as the conduit and controller through which communications to the others in the session can flow.

If desired, the networked communication between the users to exchange collaborative data may include features that allow the users to communicate with one another about the design. Alternatively, as shown in FIG. 1B, a separate user communication link 108 is illustrated. In addition to various computer-to-computer communication links that are known and used in the art for providing live, real time communications between two (or more) computers, the communication channel connection 108 further may include other types of communication channels between computers or users, such as an instant messaging channel, a peer-to-peer messaging channel, a conventional telephone connection (which may use different hardware from that involved in inputting and exchanging the collaboration data), etc. As another alternative, if desired, the users could be located in close proximity to one another and may be allowed to communicate directly, in a face-to-face conversation, without the need for a separate communication channel 108. The communication channel 108 may use the same or different hardware from that used in the collaborative data exchange.

Collaboration sessions and data exchange for collaborative design or shopping also may take place, in at least some systems and methods in accordance with this invention, via direct communication between computing devices in a peer-to-peer manner, as shown in FIG. 1C. Any desired hardware and/or protocols for this type of peer-to-peer communication may be used without departing from this invention, including conventional hardware and protocols as are known and used in the computer communications art. Also, as with the examples of FIGS. 1A and 1B described above, a separate user communication channel connection 108 may be provided (e.g., for instant messaging, additional peer-to-peer messaging, a conventional telephone connection (which may use different hardware from that involved in inputting the collaboration data), etc.). The various other alternatives as described above for FIGS. 1A and 1B also may be used in the set up of FIG. 1C without departing from this invention.

Collaborative design data and/or collaborative shopping data may be shared between the computing devices 100, 102 in any desired manner(s) using any desired protocol(s) without departing from this invention. As one more specific example, Adobe Flash Media Server 3.5 may be used to support real-time collaborative data exchange. As additional examples, collaborative data exchange may occur using commercially available features of various data exchange programs, such as WebEx® (available from Cisco Systems, Inc.) or Live Meeting (available from Microsoft, Corp.).

B. Example Features of Collaborative Product Design Systems, Methods, and User Interfaces Various features of collaborative product design systems, methods, and user interfaces (e.g., generated by a computing device for accepting user input and providing a user with information regarding the design) will be described in more detail below. Those skilled in the art will appreciate that the following description and the attached drawings merely represent examples of potential features, functionality, arrangement of interface components, orientation of interface components, combinations of interface components, and the like, of systems, methods, and user interfaces in accordance with this invention.

Figure 2:
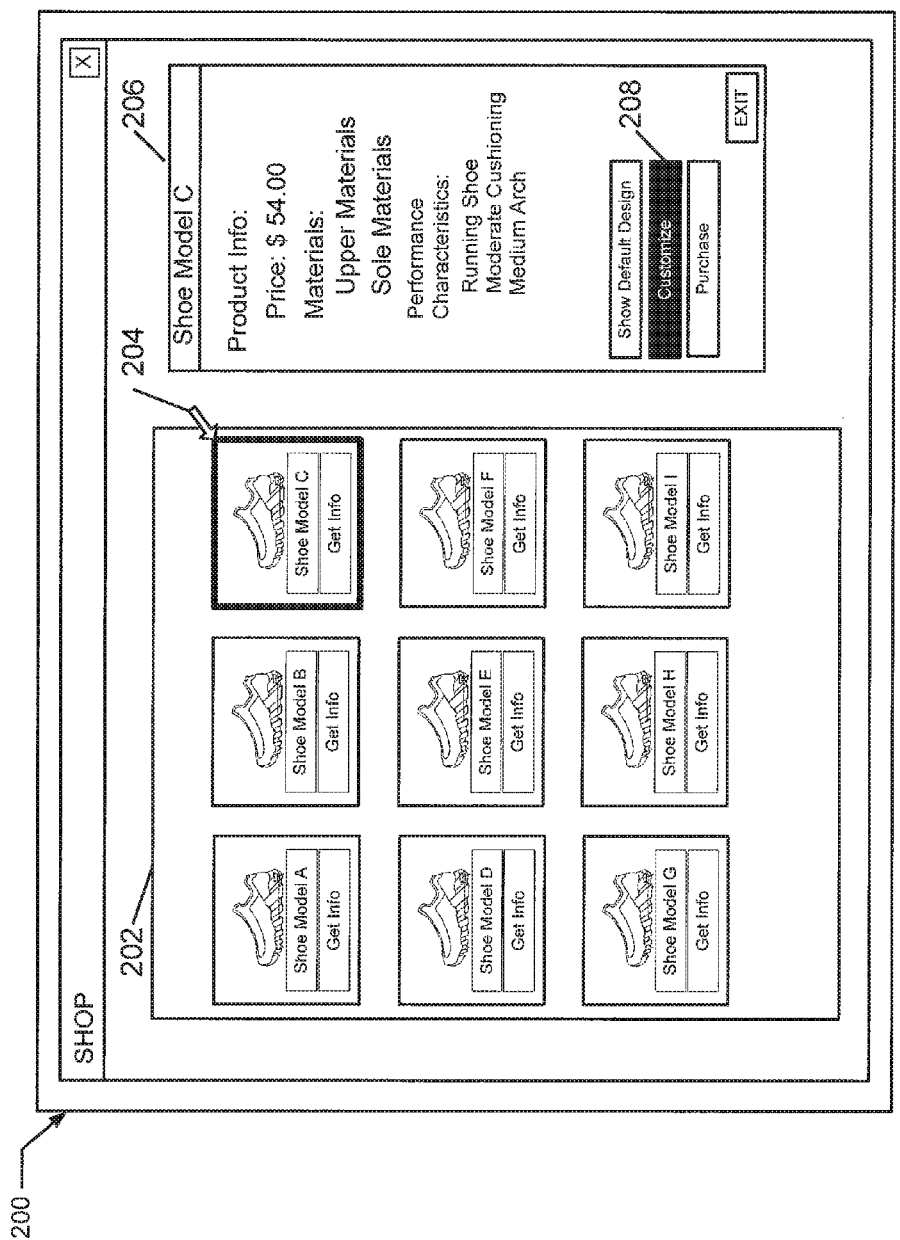
FIGS. 2 and 3 illustrate example user interface screens through which product customization functionality in accordance with examples of this invention may be launched.

In at least some examples of this invention, a collaborative design session may be launched or initiated from an individual user's on-line shopping venture. FIG. 2 illustrates an example user interface screen 200 (as may be generated on a computing device 100) in which a user is involved in an on-line shopping experience for shoes. As is conventionally known, on-line shopping websites may display various products available for purchase, e.g., in one portion of the interface display 200, such as product display panel 202, which shows a variety of footwear products, in various different models, etc., optionally from various different manufacturers and/or retailers. User input may be accepted in such systems and user interfaces, e.g., through a mouse, trackball, keyboard, rollerball, touch screen, stylus, joystick, etc., and a user may be allowed to interact with the interface and make selections using a selection device, like pointer device 204 controlled by a computer mouse or other input device. In the illustrated example display 200, the user has selected "Shoe Model C" and the product information panel 206 provides information about this selected product. Any desired product information may be provided without departing from this invention.

If desired, user interfaces for shopping websites may be provided with one or more ways to launch product customization systems and methods. This is shown in the example of FIG. 2 as a "Customize" button 208 that the user can select (selection shown by blackening the button 208 in FIG. 2) in order to launch a product customization session. Optionally, if desired, this shopping interface 200 also may allow for launch of a collaborative product design session (e.g., as will be described in more detail below).

Product design customization (and collaborative product design customization) also may be initiated from other web-sites or other on-line experiences without departing from this invention, such as through direct interaction with a dedicated product design website, through a product manufacturer's website, etc.

Figure 3:
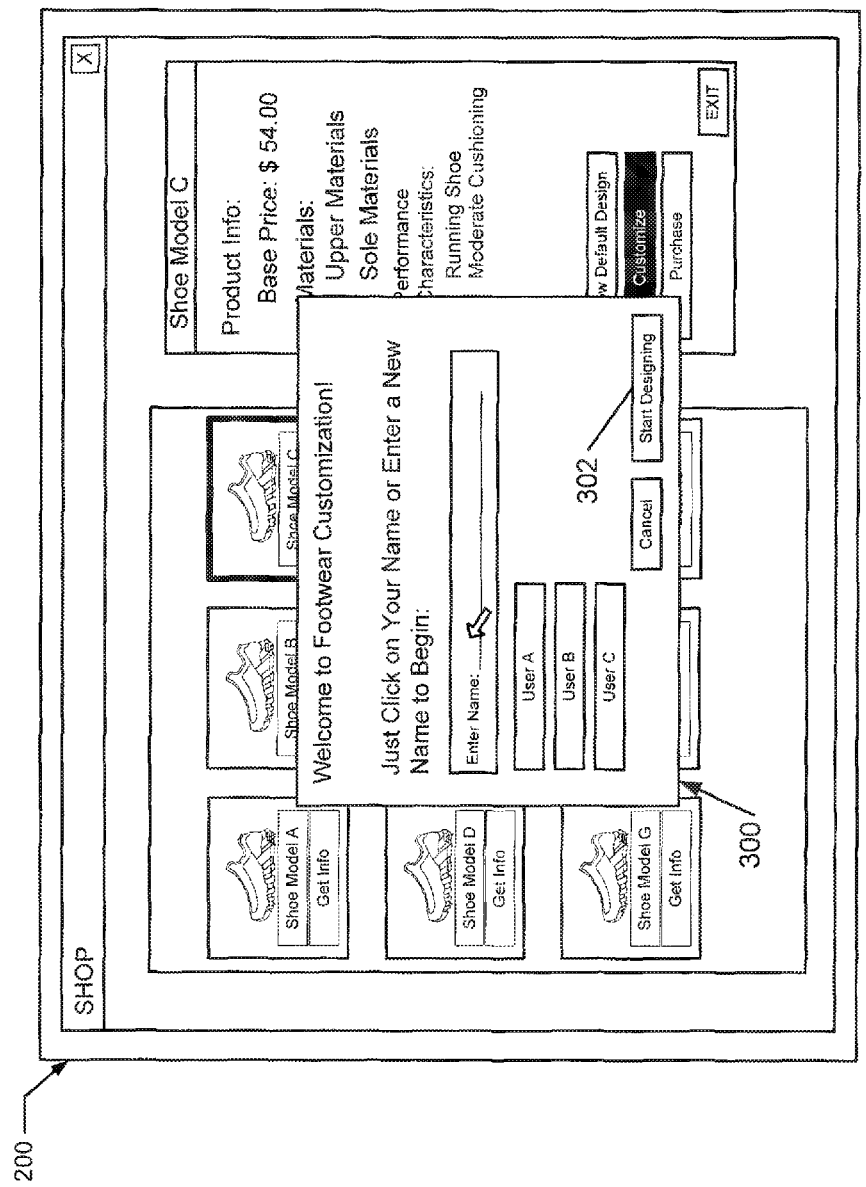

FIG. 3 illustrates an example of a user interface response that might take place as a result of initiation of a footwear product customization system and method as described above in conjunction with FIG. 2. In this illustrated example, an overlay screen portion or text box 300 is provided that requests information from the user in order to launch the customization session. For example, the box 300 may request entry of the user's name, email address, account number, user ID, password, credit card number, etc. The request(s) for information may be provided to the user in any desired manner or format without departing from this invention, such as via text input boxes, drop down listings, lists, icons, buttons, etc. Once all necessary or desired information is input, the customization session can be launched by user input at the "Start Designing" icon 302 (or in any other desired manner). Optionally, if desired, a customization session can be launched directly from the screen of FIG. 2, without the need for input of this type of additional information, without departing from this invention. This may be done, for example, if the customization system will allow the process to be performed anonymously, if the ID information for the computer starting the session is already stored and available from a previous customization session, etc. Also, ways of requesting this information using other than an overlay or text box 300 may be used without departing from this invention, such as transfer to a new website, launching of new application program and/or its user interface, etc.

Initiation of a design session may result in generation of a Customization Session Identification Number (e.g., a unique "Session ID") for the session (e.g., by a server or other computing device that will be in control of the session and the transfer of data relating to the session). Also, initiation of a design session may result in the launch of a new customization webpage or website or a customization application program, e.g., to create an example user interface screen 400 like that shown in FIG. 4. The user interface 400 may include various customization features, in any desired arrangement, orientation, or display, without departing from this invention. In this illustrated example, the user interface 400 includes a portion 402 in which the product being customized appears, a "color palette" portion 404 for selecting colors for various parts, one or more controllers 406 for changing the appearance or view of the product in portion 402 (such as rotation controls, zoom-in, zoom-out, change in views shown, etc.), an "Undo" control (to eliminate the last action), a "Redo" control (to re-do a previously erased action), a cost information panel, and a product design information panel 408. While the product design information may be provided in any desired manner without departing from this invention, in this illustrated example, the product design information panel 408 provides information about the various portions of the article of footwear being designed, such as color information, size information, material information, personalization message information (e.g., content, size, location, color, etc.), logo information (e.g., size, location, color, etc.), etc.

Figure 4:
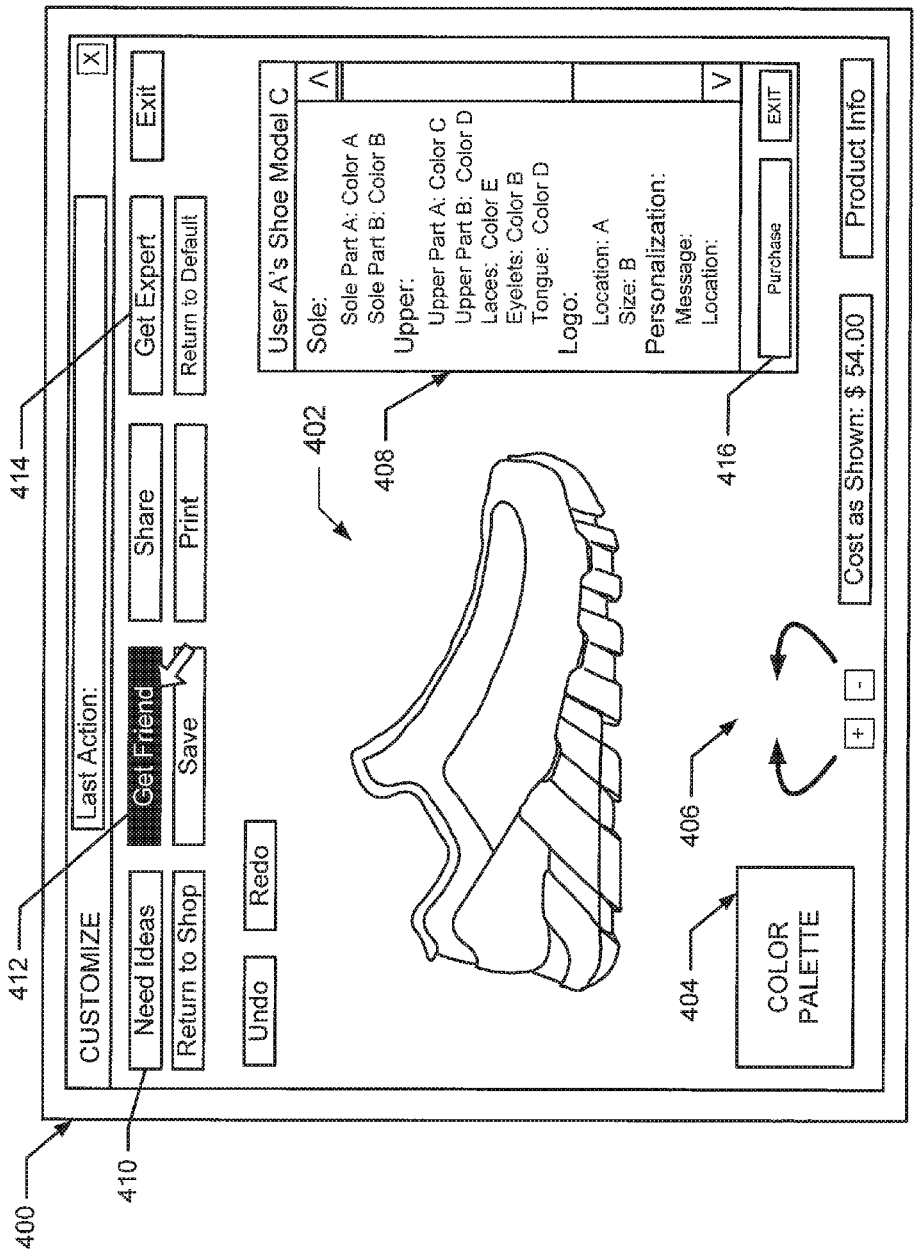
FIGS. 4 and 5 illustrate example user interface screens through which collaborative product customization functionality in accordance with examples of this invention may be launched.

Other features and functionality may be provided in this customization interface 400, if desired, without departing from this invention. For example, as shown in FIG. 4, the following features and functionality may be provided in some manner via the interface 400: the ability to directly return to the shopping website, the ability to save the design, the ability to print the design, the ability to store this design at a location for sharing with others (which may launch an interface that allows one to identify specific persons, classes of persons, or groups (public or private) with whom the design may be shared), the ability to "return to the default" design (e.g., to the blank product at which the customization process was initiated for this product or some other intermediate default design (optionally selected and stored by the user), and the ability to exit or quit the session.

As an additional potential feature, systems, methods, and computer interfaces in accordance with at least some examples of this invention may allow the user to get "inspiration" or "on-line help" during the design or customization process (e.g., by activating the "Need Ideas?" icon 410 in this example interface 400). While any desired information may be provided in response to user interaction with this portion 410 of the interface 400, in some examples, the systems, methods, and computer interfaces may display to the user information such as: a display of one or more other user designs of the same product (or a selected portion of the product); a display of one or more other user designs of a product (or a selected portion of a product) having the same or similar uses, characteristics, or functions; a display of one or more other user designs by users with similar tastes or interests (e.g., same favorite sports team, same favorite recreational activities, etc.); users from the same geographical region; users from the same age group; users from the same profession; etc.); suggestions for different colors or color combinations that might match well with existing portions of the design (e.g., complementary colors); information regarding popular colors or color combinations for one or more portions of the design (e.g., from previously designed products or inventory); and/or any other desired information (including information relating to the specific product or product line or other interesting designs or inspiring information). This interface 400 also may include functionality to allow the user to immediately purchase the customized shoe at any time during the design process, e.g., by activating icon 416 to move to an immediate "check out" procedure.

As another example of potential features and functionality, systems, methods, and computer interfaces in accordance with at least some examples of this invention may allow the user to initiate a collaborative session for designing the footwear. This may be accomplished in the presently illustrated example of FIG. 4 by user input directed to the "Get Friend" icon 412 or "Get Expert" icon 414. In this illustrated example, the user has interacted and provided input to initiate the "Get Friend" functionality, which will be described in more detail below.

Figure 5:
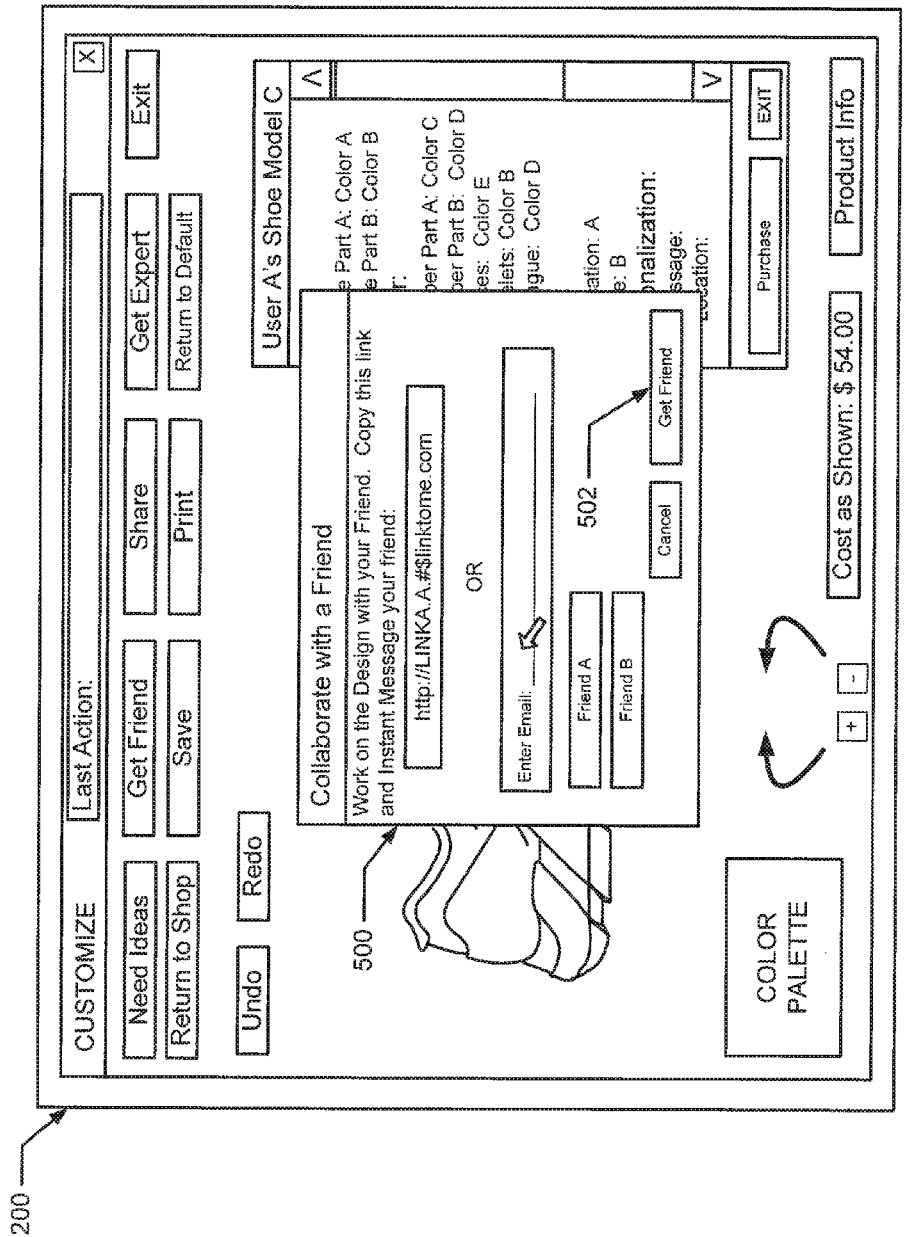

FIG. 5 illustrates an example of a user interface response that might take place as a result of initiation of a collaborative footwear product customization system and method as described above in conjunction with FIG. 4. In this illustrated example, an overlay screen portion or text box 500 is provided that requests information from the user in order to launch the collaborative session. For example, the box 500 may request entry of a name, email address, or other information to identify and/or contact the person or persons to be invited to the collaboration design session. The request(s) for information may be provided to the user in any desired manner or format without departing from this invention, such as via text input boxes, drop down listings, lists, icons, buttons, etc. Once all necessary or desired information is input, the invitation to the collaborative design session can be launched by user input at the "Get Friend" icon 502 (or in any other desired manner). Optionally, if desired, a collaborative design session can be launched immediately, directly from the screen of FIG. 4 or FIG. 5, without the need to wait for each invitee to reply. Alternatively, if desired, systems, methods, and user interfaces in accordance with examples of this invention may wait to launch the collaborative session until after at least one invitee has accepted (optionally, if desired, during the wait time, the original user attempting to set up the collaboration session can be returned to the customization interface (e.g., of FIG. 4) to continue working on the design, and he or she can be informed of the acceptance of invitees during that session). Ways of requesting the invitee information using interface elements other than an overlay or text box 500 may be used without departing from this invention, such as through transfer to a new website, launch of new application program and/or its user interface, etc.

As another potential example, the invitation interface may include the capability for the user to suggest a time and date for the collaborative session (if an immediate session is not desired or not possible). Such an invitation may appear as a "meeting request" at the invitee's system and/or may appear as an entry on his or her electronic schedule or calendar program.

As shown in FIG. 5, the communications between the initial user and his/her invitees may take place through communication channels that differ from the communication channels through which the customization and/or collaborative design data will flow. For example, systems, methods, and user interfaces according to examples of this invention may direct the initial user to provide a session link to the desired invitee(s) via another communication channel, such as instant messaging, email, etc. As noted above in conjunction with FIGS. 1A through 1C, other communication methods may be provided without departing from this invention.

Initiation of a collaborative design session may result in generation of a Collaborative Design Session Identification Number (e.g., a unique "Session ID") for the session (e.g., by a server or other computing device that will be in control of the session and the transfer of data relating to the session). Alternatively, if desired, the previously generated Customization Session ID (if any) also may be used for the Collaborative Design Session ID. With the invitation, the Collaborative Design Session ID may be transmitted to the invitees to allow them to enter the correct session. If desired, each invitee may be required to enter a user ID, password, and/or other information to enter the session (information optionally transmitted to the invitees via a different means from the initial invitation).

Figure 6:
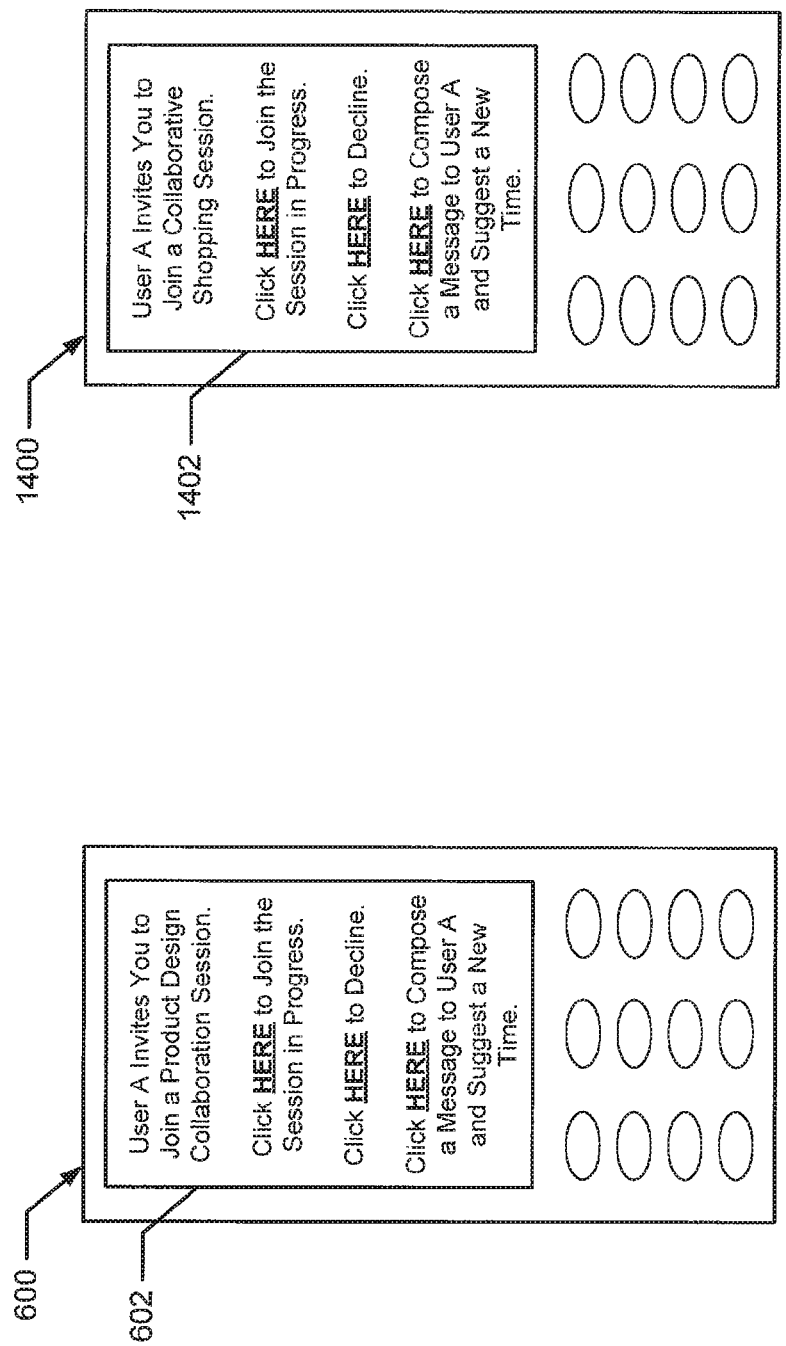
FIG. 6 illustrates an example user interface screen receiving an invitation to an on-line collaborative product customization session in accordance with examples of this invention.

In response to issuance of the "invitations" to the collaborative session, the invitees will receive a message (e.g., at their email box, via instant messaging, on their calendar or scheduling program, etc.) inviting them to the collaborative design session (e.g., either for immediate launch or as a future calendar entry or meeting request). FIG. 6 illustrates an example user device 600 including a display screen 602 on which the invitation may appear. The invitation and the user interface screen 602 thereof in this example advise the invitee of the session and allow various responsive interactions, e.g., to join the session immediately, to decline, or to prepare and send a responsive message. Additionally or alternatively, systems, methods, and user interfaces in accordance with examples of this invention may provide other options, such as an option to suggest a new time/date for the session, an option to suggest an additional party to invite to the session, an option to forward this invitation to another device or party (such as to the invitee's laptop computer as opposed to the illustrated telephone device), call-in information for an associated audio and/or video teleconference, etc. Also, if desired, the display 602 may include sufficient information (e.g., session ID, invitee's user ID, session password, etc.) to allow the user to enter the collaboration session via a device other than the one on which the invitation was received. Any desired information may be presented to the invitee via display 602 and any desired information may be returned from the invitee(s) to the initiator or to the computer system running the session, without departing from this invention.

The user and his or her invitees need not access the collaborative sessions through the same website or interface portal. For example, one user may access the session through the manufacturer's or retailer's website while an invitee to that same session may access the session through a social networking website, an email management website, mobile devices, in-store or in-mall kiosks, video games, or any other desired website or application that will allow access to and support the session (e.g., the same website or application over which the invitation was initially received).

Collaborative design sessions with a design expert, e.g., via the "Get Expert" icon 412 in the interface 400 of FIG. 4, may be initiated in the same or similar manners to those described above in conjunction with FIGS. 5 and 6. As some more specific examples of options with respect to this feature, users may be prompted (e.g., via an interface like that shown in FIG. 5) to identify a specific expert desired (e.g., by name), a specific type of expertise desired (e.g., aesthetic design, materials, arch support or other functional characteristics, manufacturer's product line expert (technical expert or design expert), etc.), next available expert, any available expert, etc. Also, as described above, specific expert design session appointments also could be set up using systems, methods, and user interfaces in accordance with examples of this invention, e.g., by sending a "meeting request" type message to an expert. The expert may help the user pick and design the best product for his or her uses (e.g., including the proper technical or performance characteristics) and/or help create new and interesting aesthetic designs.

If desired, systems, methods, and/or computer interfaces in accordance with at least some examples of this invention may allow users to assign a "rating" to or "rank" an expert and/or otherwise critique their experience with using an expert on the systems and methods in accordance with this invention. This feature may be used, for example, as quality control and to provide feedback to the manufacturer, sales entity, system owner, or sponsor regarding the conduct or its employees, contractors, or others providing "expert" consultation services to users of systems and methods according to this invention. The expert also may "earn" his or her ranking or rating or be assigned a ranking or rating from the manufacturer, sales entity, system owner, or sponsor, e.g., based at least in part on past accomplishments in the field, feedback from users of systems and methods according to this invention, feedback from other experts, past design work, reputation, etc.

Figure 7:
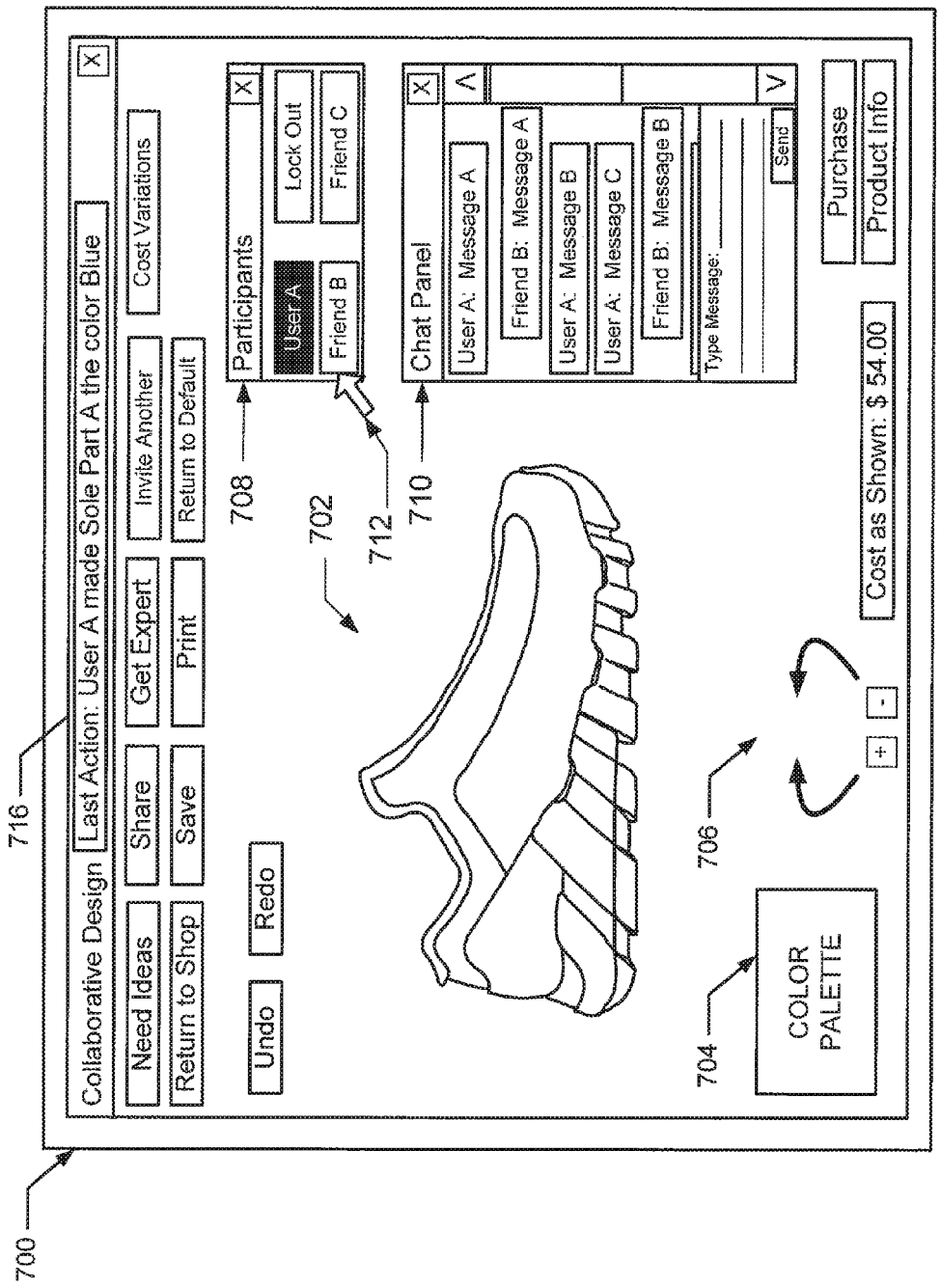
FIGS. 7-11 illustrate various example features and functionality of on-line collaborative product customization systems, methods, and user interfaces in accordance with examples of this invention.

Initiation of a collaborative design session may result in the launch of a new collaborative design application program, webpage, and/or website, e.g., like the example user interface screen 700 shown in FIG. 7. All of the users within the design session may show an interface screen that is the same as or similar to that shown on the session initiator's display (e.g., like that shown in FIG. 7), although the session invitees may have somewhat fewer features and functionality as compared to the session initiator, if desired. The interface 700 for the collaborative design session may be the same as or similar to the individual user's customization interface 400 shown in FIG. 4. For example, as shown in FIG. 7, this interface 700 also includes a product display portion 702, a color palette portion 704, product view controls 706, product cost information (based on the presently displayed design), immediate purchasing capabilities, undo capabilities, redo capabilities, "Need Ideas" inspiration capabilities, sharing capabilities, saving capabilities, printing capabilities, "Return to Default" design capabilities, "Get Expert," capabilities, and "Return to Shop" capabilities, as described above in conjunction with FIG. 4.

This example user interface 700, however, includes additional features and functionality. For example, interface 700 includes a "Participants" panel 708 in which the various participants in the collaborative design session are identified in some manner, e.g., by user name or another name entered when the session was joined, by picture, by icon, by avatar, etc. The interface 700 also may allow at least one user, such as the user that initially set up the collaborative session, to control the features and functionality presented and available to the invitees, e.g., by partially or totally locking out one or more invitee, by setting limits on the manner in which one or more of the invitees can change the design, by limiting communications from one or more parties, etc. Any desired level of session control and/or design interaction may be provided to each user and/or invitee without departing from this invention, such as no control and no design alteration rights, complete control and complete design alteration rights, limited control and limited design alteration rights, and any combinations of these control or design alteration rights capabilities.

The example interface 700 shown in FIG. 7 also includes a communications display portion 710, which in this example is a text message or "chat" panel. This communication display portion 710 allows the various users to conduct an on-line discussion as the various features of the footwear design are changed and shown to everyone on their individual display devices, e.g., to allow session participants to make suggestions, request control, ask questions, provide reactions to changes, etc.

In the example interface shown in FIG. 7, a single user at a time (e.g., the initial user that set up the session or one invitee), at their own computing device, may control the input through which the design is changed or through which the product portion 702 appearance is changed. In other words, one party at a time will control the pointer 712 (which may be moved by a mouse or other device) and the interface 700 will respond to input from a single party at a time. If desired, the party that initially set up the collaboration session (or another designated party) may have ultimate override control and the capability to forcibly obtain control of the pointer 712 and/or other input capabilities from the others in the session.

Figure 8:
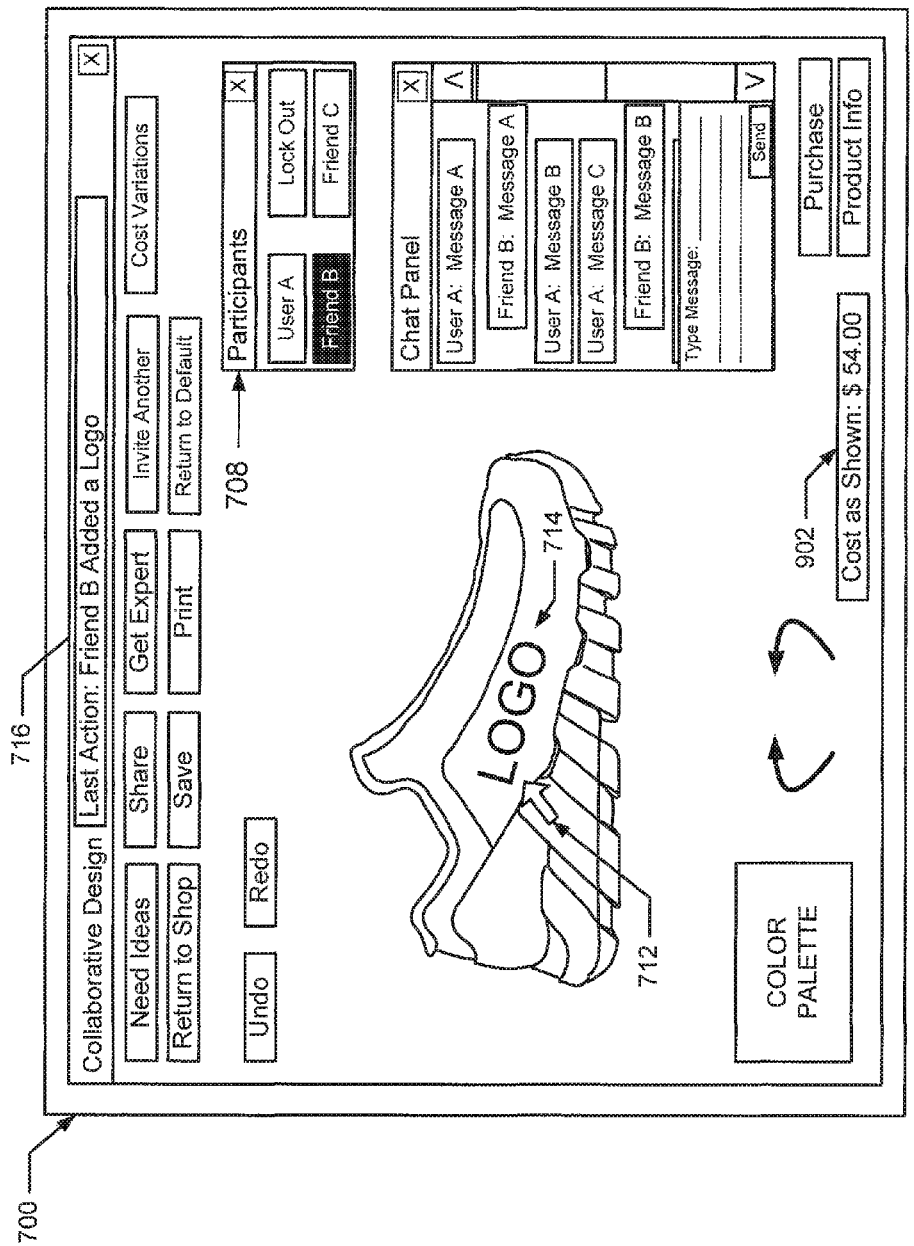

The "Participants" panel 708 (or other desired portion of the interface 700) may display which of the collaborating parties is in control of the input at any given time. In this illustrated example, as shown in FIG. 7, the party in control is highlighted in some manner (e.g., by a different colored box, by bolding, by italicizing, by a separate indicator of some sort, by size differential, by pictorial or graphical representation, etc.). At this time in this example system, method, and interface, "User A" is indicated as being in control of the design session pointer 712 and the ability to input design data. At the time shown in FIG. 7, User A is in the process of transferring control of the pointer 712 and the collaborative design input capabilities to Friend B. While this transfer may be accomplished in any desired manner without departing from this invention, in this illustrated example, User A moves pointer 712 to the icon of Friend B in the "Participants" panel 708 and clicks his or her mouse (or otherwise enters input to select the "Friend B" icon). This action may transfer input control to Friend B and will result in a change in the "Participants" panel 708 to the form shown in FIG. 8, wherein Friend B is now indicated as the party in control of the pointer 712 and the design input.

At this point, Friend B can now enter any changes to the footwear design that he/she desires. In this specific example, Friend B has added a logo 714 to the lateral side of the shoe, which may have included input relating to various design choices, such as selection of the logo (e.g., from one or more manufacturer's logos (or logos of others, such as sports teams, clubs, etc.), from a menu listing, from an icon or graphic display, etc.), selection of the logo color, selection of the logo position, selection of the logo size, selection of the logo orientation, etc. Notably, this action also precipitated a change in the "Last Action" identifier box 716, as shown by a comparison of FIGS. 7 and 8. If desired, this box 716 may include a drop down menu (or other interface) to allow one or more users to view the last several steps in the session (and possibly scroll to see all steps in the session), more details regarding the individually displayed step (e.g., more specifics about the logo color, position, size, or orientation selections, etc.), or the like. This "Last Action" box 716 and its potential drop down menu to show additional steps in the process may allow the party in control to select any desired individual step for further action, such as an "undo" action (to undo that step), a "view" change action (e.g., to cause the interface to highlight the change made at that step in the users' views), a reselection action (e.g., to cause the interface to reselect the same part for further action), etc.

Data input by a collaborating party in systems, methods, and computer interfaces in accordance with examples of this invention may be tagged with various data. For example, a "data packet" associated with a change to the feature (e.g., one data packet per change) may include data relating to one or more of: a time stamp; identification of the collaborator making the change (e.g., a user ID); identification of the object being changed (e.g., a part ID); and data payload indicating the change (e.g., new color, new size, new position, new orientation, new element, orientation with respect to another element, new material, etc.). This data packet may be sent to a central server or to the individual user computing device designated as in control of input to the design (if any), typically the initiating collaborator's computing device. From the controlling computing device, the data packet, if accepted (as will be described in more detail below in the discussion of data collisions), will be transmitted to the other computers in the session (including, if necessary, the computing device of the party that initially entered the change, although that party's display may be updated when the initial input is received). Optionally, if desired, the data packet can be sent directly from the user's computing device at which the change was made to any other desired computing devices participating in the session. When the receiving computing devices receive the data packet, they can parse the incoming data for the design change features and update its display.

Figure 9:
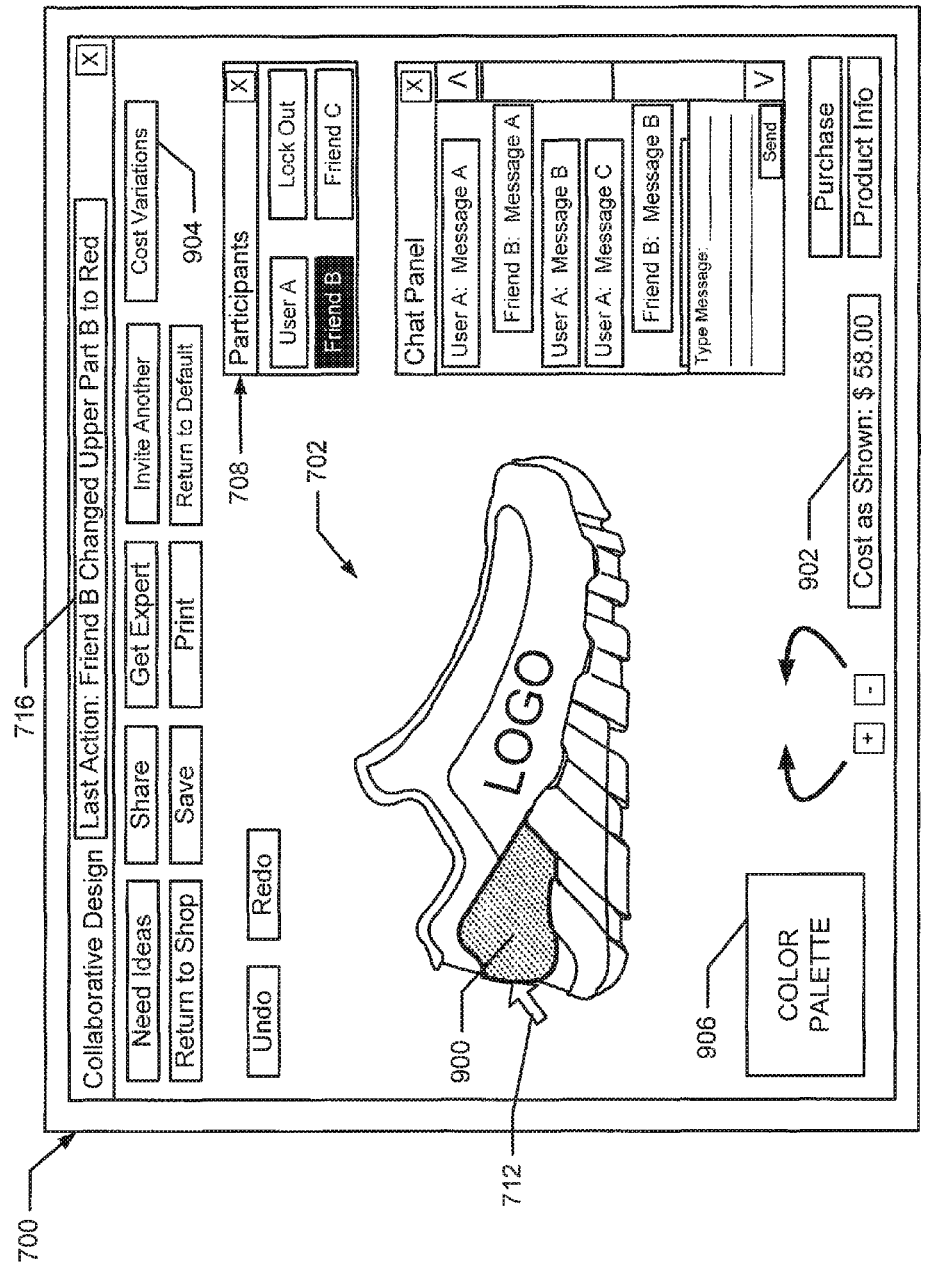

FIG. 9 illustrates another example step that might be included in an overall collaborative design session, which helps illustrate various features and functionality of systems, methods, and user interfaces in accordance with examples of this invention. In this step, as shown in FIG. 9, the heel reinforcement part 900 of the displayed article of footwear in the design portion 702 of the interface 700 has been changed to the color red by Friend B, who is now in control of the input device 712. Note, for example, the change in the "Last Action" box 716 description and also note that Friend B's icon is highlighted in the "Participants" box 708. This change by Friend B results in a change in appearance of the color of the heel reinforcement part 900 (as compared to FIG. 8). Moreover, this change would immediately be displayed on Friend B's computer display, and a data packet relating to this change would be transmitted over the collaborative design data connection for display on the user interfaces being used by the other participants in the session.

Changes to various selected portions of the shoe design may be made in any desired manner without departing from this invention. For example, a user might first use the pointer 712 to "select" some specific part of the shoe (e.g., the heel reinforcement part 900, a visible portion of the midsole, a portion of the outsole, the tongue, eyelets, laces, toe cap, tread elements, etc.). Interface elements also could be provided to allow user selection of and changes to parts of the article of footwear that may not be visible, such as fluid-filled bladders, plates in the sole, etc. Once selected, the user can make changes to that element. For example, to change color of a part of the shoe, first the user may move the pointer 712 over the depiction of the desired part in the display portion 702 and "click" a mouse button (or other input device) to "select" that part. This selection action may cause the interface to highlight the part in some manner, such as by enlarging it, coloring it differently, or, as shown in FIG. 9, by bolding the external boundary of it. Then, with the part highlighted, the pointer 712 may be moved to select a color from the color palette 906 (e.g., from a color display chart, from preselected color tiles or elements available for that part, from a menu, etc.). When the new color is selected (e.g., by the user again clicking the mouse button or otherwise entering selection input), the systems, methods, and user interfaces according to this invention may immediately change the color of that part on that user's screen and send a data packet to the appropriate location(s) to allow this same change to be made on the user interfaces of the other users as well. In addition to color changes for the various parts, users could select various other features for customization, such as tread designs, midsole thickness, outsole thickness, midsole window sizes and/or locations (which may allow a view of internal structures of the midsole, such as a fluid-filled bladder, etc.), number of eyelet pairs, etc. Any desired structural, design, or other changes may be made to the shoe design in this general manner without departing from this invention.

Another example feature of systems, methods, and computer interfaces in accordance with at least some examples of this invention relates to the "cost" or "pricing" box 902. This element of the user interface 700 tracks the cost of article of footwear in its present design state. As one or more features of the shoe are designed or changed, this may cause the cost of the shoe to change somewhat (e.g., if more expensive materials are used, if a large amount of personalization or customization is requested, if additional production steps or different production techniques are required, etc.). Note the changes in the cost box 902 between FIGS. 8 and 9, which would indicate that at least some change made between the screenshots of FIGS. 8 and 9 resulted in a price change for the product. By maintaining a price display 902, the user can be aware of which changes to the design have caused an undesired shift in price, and they may be better able to control the final price of the product.

FIG. 9 illustrates another potential feature that may be included in systems, methods, and computer interfaces in accordance with at least some examples of this invention. This example interface 700 includes a "Cost Variations" icon 904 (although other interface elements may be used to activate this functionality). User selection of this interface element 904 will provide users with information and an opportunity to change various features of the designed shoe to either increase or decrease its costs (optionally, with little or no performance change, although any anticipated effect on performance may be displayed for the user to consider (e.g., "less breathability," "more stiff feel," etc.). For example, interaction with this interface element 904 may provide shoe "upgrade" information, which could advise the user of various potential "upgrade" features available, the performance changes (if any), and the costs associated with making such an upgrade. As a more specific example, a change in material for some portion(s) of the upper or sole structure may make the shoe more comfortable, more stable, and/or otherwise affect its performance characteristics. As another example, the interface may advise the collaborating team of the costs associated with adding another design element or feature to the shoe (e.g., adding an additional personalized message, adding a picture or graphic, etc.) or changing an existing design element or feature (e.g., changing sizes of various design elements or personalization elements, changing materials, etc.). The cost change associated with eliminating a design element or feature also may be provided. Systems, methods, and computer interfaces according to the invention may display a list of various options to the user with the cost differential associated therewith, or in some other manner make this type of cost variation information available to the collaborating design team.

Figure 10:
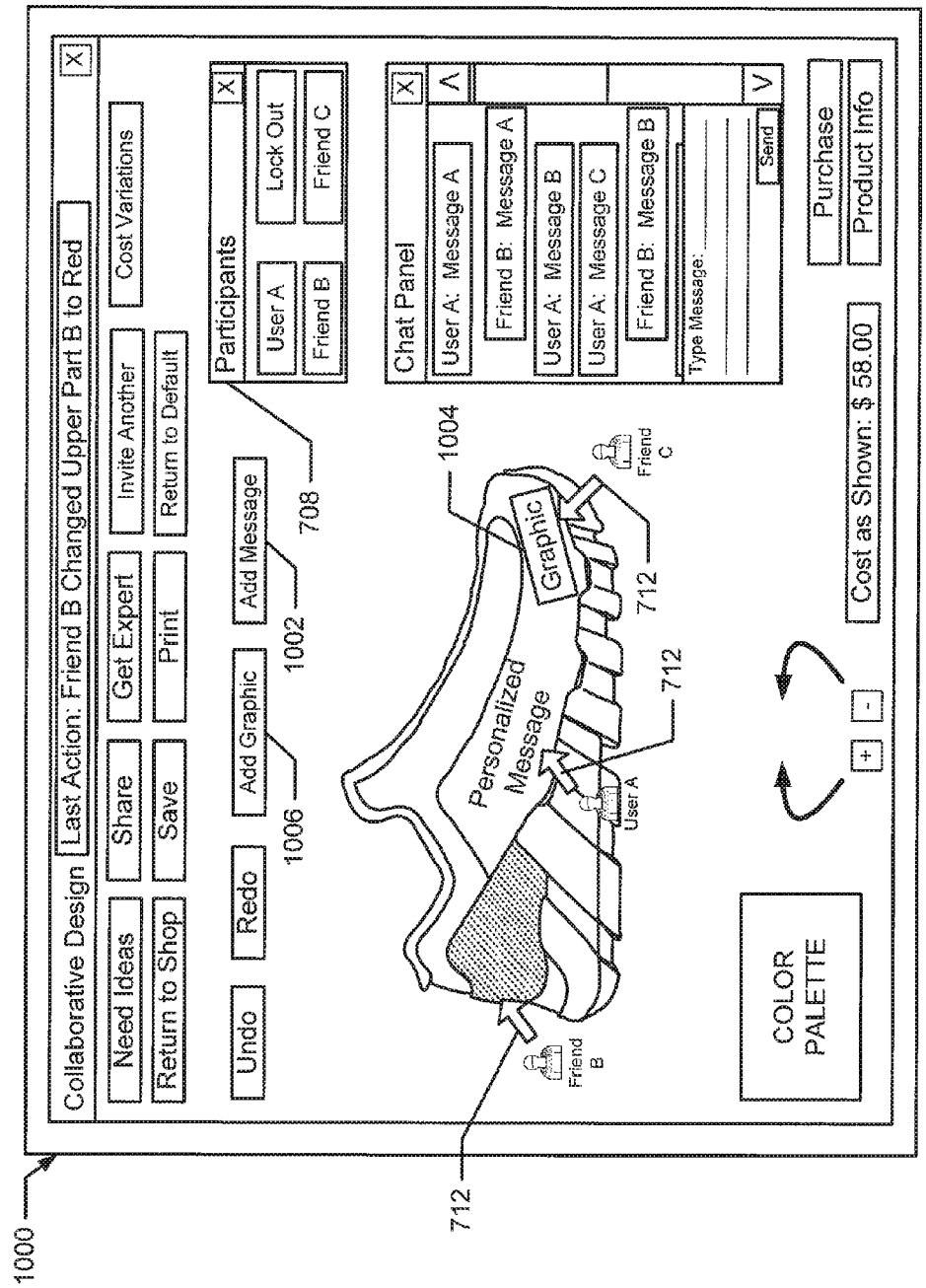

In the systems, methods, and user interfaces described above, a single party of the collaborating group controls the input (e.g., pointer 712, the interface screen 700, etc.) at a time. This is not a requirement. Rather, if desired, systems, methods, and computer interfaces could be programmed and adapted to accept input from multiple collaborating parties (any and/or all of the user and his/her invitees) at any given time during a session. Each party may have his or her own pointing device 712, which may be labeled in some manner to identify the controlling party and displayed on the display of each party in the session. Any manner of marking the pointing devices 712 to indicate the user in control thereof may be used without departing from this invention, such as color coding, text, icons, graphics, pictures, audio/video data, avatars, and the like. FIG. 10 shows an example of an interface screen 1000 in which all three users in the example collaboration session have their own independent pointer 712. If desired, to avoid over-cluttering each individual user interface with several pointer devices 712, each user's display screen may show only their own pointer 712, a selected number of pointers 712, or in some manner reduce the size or minimize the appearance of the other participant's pointers 712 on the display (e.g., by showing them in a small size, by "graying" them out somewhat, by making them more transparent, by showing them only when that user is taking various actions, etc.).

When multiple users are able to interact with any desired portion of the design at any time, data "collisions" are possible. In other words, two or more parties may attempt to interact with and change some features of the same element in the design at the same time (or at substantially the same time). Data collisions of this type may be handled in any desired manner without departing from this invention. For example, each user's input data may be tagged with a time stamp that enables a central server computer (or any of the user's computers that controls changes to the collaborative design and distributes the data packets to other users) to handle the colliding data in any desired manner. As some more specific examples, systems, methods, and user interfaces in accordance with various examples of this invention might: (a) display the first in time change and ignore later changes that come to that part within a predetermined time frame; (b) display the last in time change (even if some changes never are displayed or are displayed only fleetingly); (c) display changes based on a predetermined hierarchy (e.g., when multiple changes to a specific part are received within a predetermined time period, display only one change, using the hierarchy: User A, Friend B, Friend C, Friend D, etc.); (d) toggle the display between the various changes received to the part (and allow the session initiator (or any other desired party) to make a final choice on which change to keep); (e) display one change and advise the users of the existence of the other changes (and give an opportunity to display those changes); etc.

FIG. 10 illustrates various additional potential features and functionality that may be included in systems, methods, and user interfaces in accordance with at least some examples of this invention. For example, as shown in FIG. 10 (as compared to FIG. 9), the manufacturer's logo has been replaced on the lateral side of the shoe with a personalized message. Users can launch this "personalized message" feature in any desired manner, such as via a toolbar menu item, or as shown in FIG. 10, by interacting with an "Add Message" icon 1002 (e.g., by selecting the icon 1002 using a pointer device 712). Interaction with this icon 1002 may cause a text insertion box to pop up (at least on the selecting user's computer interface screen 1000), and the user may be able to type or write in any desired message using that insertion box (optionally, the available message length may be limited based on available space at the desired location for the message). If desired, this text insertion box could be displayed only at the selecting user's computer, to avoid cluttering up the interface screens of the other users. The user selecting the icon 1002 also could select other features of the message such as font, size, location, orientation, line breaks, etc. If desired, systems, methods, and user interfaces in accordance with examples of this invention also may allow the user to drag the message around (e.g., using the pointer device 712) to aid in positioning or orienting the message with respect to the shoe structure. The personalized message may be applied to any desired portion of the shoe structure being designed, such as the upper, the midsole, the outsole, the interior bootie, the tongue element (top side or underside), etc., and even to multiple parts of the shoe, if desired.

FIG. 10 also illustrates placement of a graphic element 1004 on the shoe structure, such as a picture, graph, icon, avatar, clip art, or other graphic element. Users can launch this "graphics insertion" feature in any desired manner, such as via a toolbar menu item, or as shown in FIG. 10, by interacting with an "Add Graphic" icon 1006 (e.g., by selecting the icon 1006 using a pointer device 712). Interaction with this icon 1006 may cause a graphic file selection box to pop up (at least on the selecting user's computer interface screen 1000), and the user may be able to choose a saved file corresponding to the desired graphic for insertion into the shoe structure using that selection box. If desired, this graphic file selection box could be displayed only at the selecting user's computer, to avoid cluttering up the interface screens of the other users. The user selecting the icon 1006 also could select other features of the graphic such as size, location, orientation, etc. If desired, systems, methods, and user interfaces in accordance with examples of this invention also may allow the user to drag the graphic around (e.g., using the pointer device 712) to aid in positioning or orienting the graphic with respect to the shoe structure. The graphic may be applied to any desired portion of the shoe structure being designed, such as the upper, the midsole, the outsole, the interior bootie, the tongue element (top side or underside), etc., and even to multiple parts of the shoe, if desired.

Figure 11:
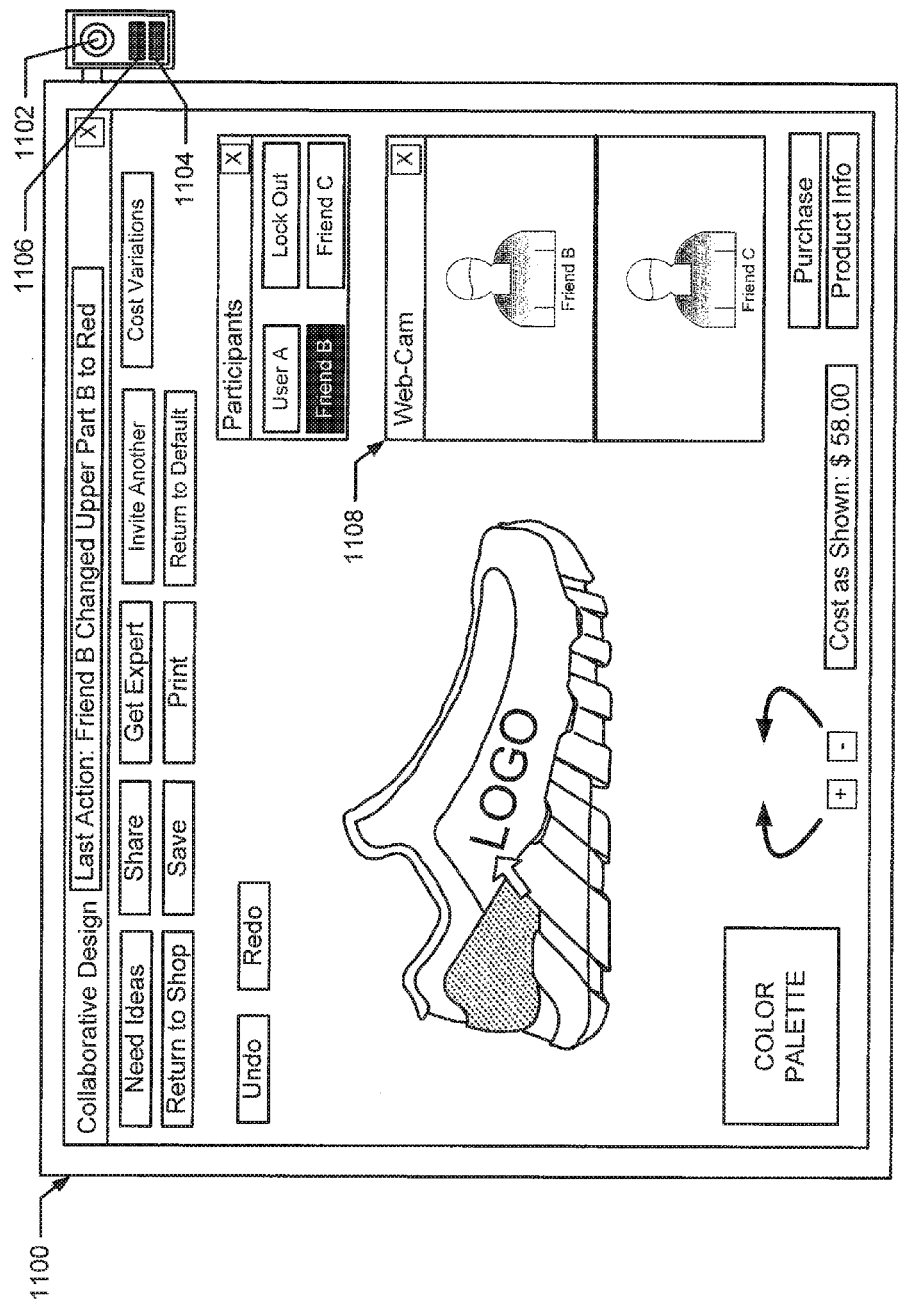

FIG. 11 illustrates another example user communication channel or system that can be used in systems, methods, and user interfaces in accordance with at least some examples of this invention. Rather than using text messaging or email for collaborating user communications during a collaboration session (as shown in FIGS. 7-10), users can communicate via video teleconferencing or "web-cam," as shown in the system 1100 of FIG. 11. To participate via video teleconferencing, each user's computing system may include a video camera 1102, a microphone 1104, and a speaker 1106 to enable audio and video communications between the users. Also, a live video depiction of each participant in the session (or some of the participants) may appear in a video display panel 1108 on the user interface screen. If desired, rather than a video display panel 1108, the user's web-cam image could be positioned to move with the user's pointer device 712, and in that manner also serve as the indicator of the user in control of a specific pointer (e.g., with features available to users to enlarge the size of the user's image, if desired).

Also, if desired, just audio communications could be transmitted by systems, methods, and user interfaces in accordance with examples of this invention. Any desired, live and/or streaming audio and/or video feed systems and protocols may be used without departing from this invention, including conventional systems and protocols as are known and used in the computer communications arts, as well as conventional telephone calls.

Figure 12:
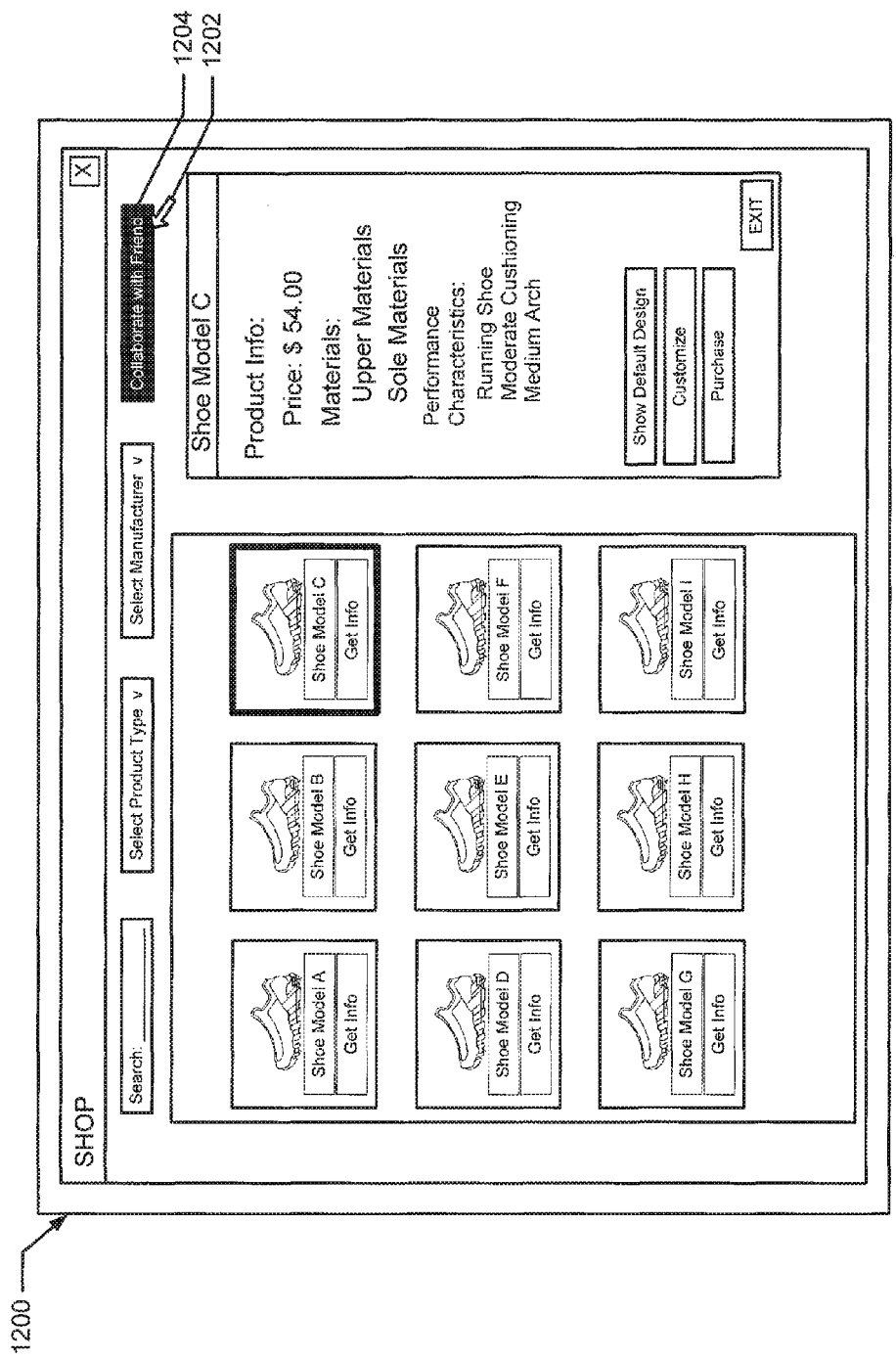
FIGS. 12 and 13 illustrate example user interface screens through which collaborative product shopping functionality in accordance with examples of this invention may be launched.

C. Example Features of Collaborative Product Shopping Systems, Methods, and User Interfaces FIGS. 4 through 11 described above relate primarily to features and functionality of this invention as they relate to collaborative product customization and/or design. Other aspects of this invention relate to the use of collaboration for other on-line commerce activities, such as shopping. FIG. 12 illustrates an example user interface display screen 1200 that may be used in an on-line shopping environment (e.g., similar to the one shown in FIG. 2). For example, this shopping website may display various products for potential purchase and information relating to these products, and it may allow a user to conduct various searches, such as searches by keyword, searches for predefined product types or genres (which may be listed via a drop down menu, such as "footwear," "apparel," "Men's," "Women's," "Children," "electronics," etc.), searches for specific manufacturers (or retailers), etc. Such shopping websites are conventionally known and available in the art.

In addition to various shopping capabilities, this example system, method, and computer interface allows a user to initiate a collaborative on-line shopping session. Although any desired manner of initiating a collaborative session may be provided without departing from this invention, in this illustrated example, the session is initiated due to user input, using a pointing device 1202 (coupled with user interaction via a mouse, rollerball, touch screen, stylus, etc.), directed toward icon 1204. Collaborative shopping sessions also may be initiated from other web-sites or other on-line experiences without departing from this invention, such as through direct interaction with a dedicated collaborative shopping website, through a product manufacturer's website, through on-line retailer's websites, etc.

Figure 13:
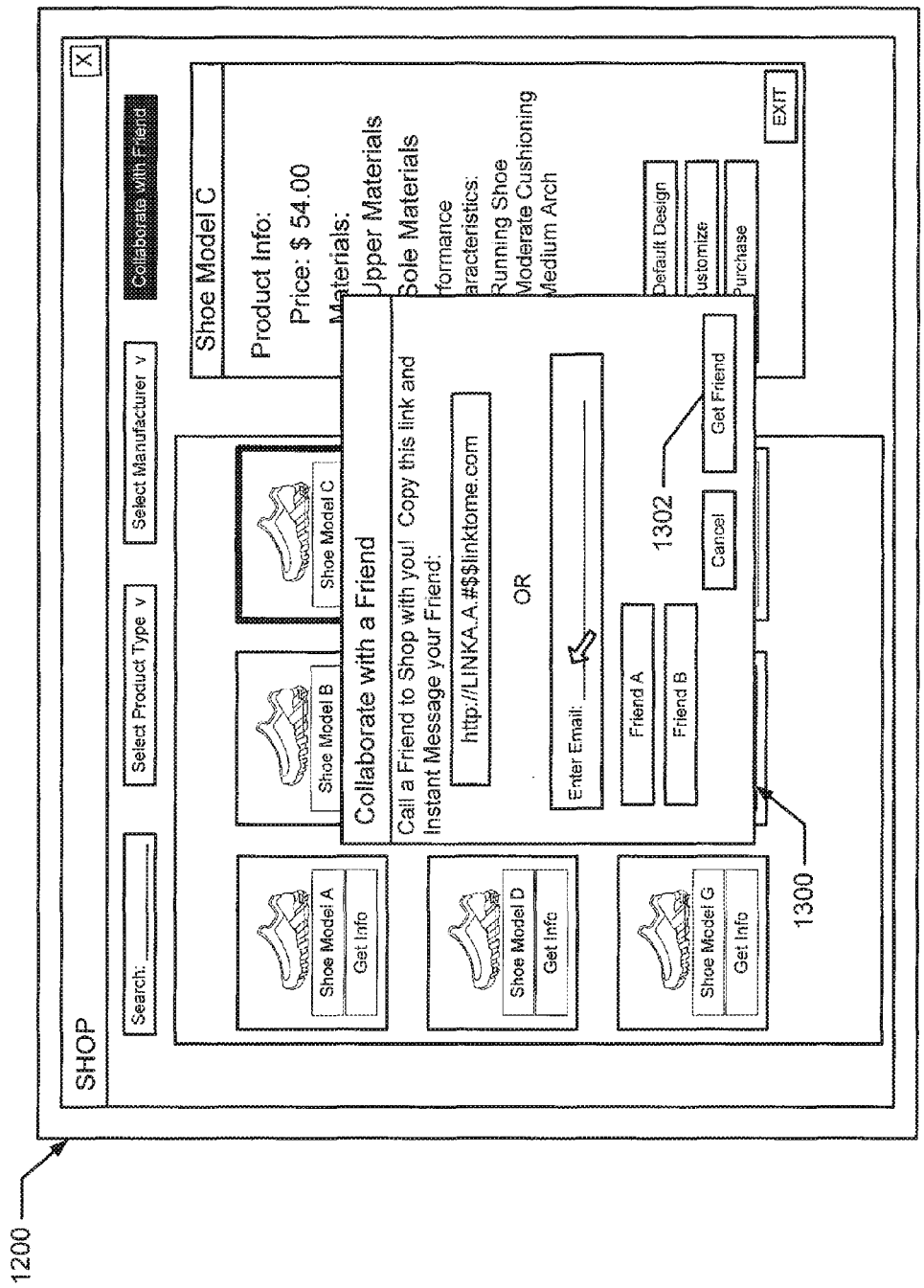

FIG. 13 illustrates an example of a user interface response that might take place as a result of initiation of a collaborative shopping system and method as described above in conjunction with FIG. 12. In this illustrated example, an overlay screen portion or text box 1300 is provided that requests information from the user in order to launch the collaborative session. For example, the box 1300 may request entry of the friend's name, email address, or other information to identify and/or contact the person or persons to be invited to the collaboration shopping session. The request(s) for information may be provided to the user in any desired manner or format without departing from this invention, such as via text input boxes, drop down listings, lists, icons, buttons, etc. Once all necessary or desired information is input, the invitation to the collaborative shopping session can be launched by user input at the "Get Friend" icon 1302 (or in any other desired manner). Optionally, if desired, a collaborative shopping session can be launched immediately, directly from the screen of FIG. 12, without the need to wait for each invitee to reply. Alternatively, if desired, systems, methods, and user interfaces in accordance with examples of this invention may wait to launch the collaborative session until after at least one invitee has accepted (optionally, if desired, during the wait time, the original user attempting to set up the collaboration session can be returned to the shopping site, and he or she can be informed of the acceptance of invitees while continuing the shopping session alone). Ways of requesting the invitee information using interface elements other than an overlay or text box 1300 may be used without departing from this invention, such as through transfer to a new website, launch of new application program and/or its user interface, etc.

As another potential example, the invitation interface may include the capability for the user to suggest a time and date for the collaborative session (if an immediate session is not desired or not possible). Such an invitation may appear as a "meeting request" at the invitee's system and/or may appear as an entry on his or her electronic schedule or calendar program.

As shown in FIG. 13, the communications between the initial user and his/her invitees may take place through communication channels that differ from the communication channels through which the collaborative shopping data will flow. For example, systems, methods, and user interfaces according to examples of this invention may direct the initial user to provide a session link to the desired invitee(s) via another communication channel, such as instant messaging, email, etc. As noted above in conjunction with FIGS. 1A through 1C, other communication methods may be provided without departing from this invention.

Initiation of a collaborative shopping session may result in generation of a Shopping Session Identification Number (e.g., a unique "Session ID") for the session (e.g., by a server or other computing device that will be in control of the session and the transfer of data relating to the session). With the invitation, the Shopping Session ID may be transmitted to the invitees to allow them to enter the correct session. If desired, each invitee may be required to enter a user ID, password, and/or other information to enter the session (information optionally transmitted to the invitees via a different means from the initial invitation).

In response to issuance of the "invitations" to the collaborative session, the invitees will receive a message (e.g., at their email box, via instant messaging, on their calendar or scheduling program, etc.) inviting them to the collaborative shopping session (e.g., either for immediate launch or as a future calendar entry or meeting request). FIG. 14 illustrates an example user device 1400 including a display screen 1402 on which the invitation may appear. The invitation and the user interface screen 1402 thereof in this example advise the invitee of the session and allow various responsive interactions, e.g., to join the session immediately, to decline, or to prepare and send a responsive message. Additionally or alternatively, systems, methods, and user interfaces in accordance with examples of this invention may provide other options, such as an option to suggest a new time/date for the session, an option to suggest an additional party to invite to the session, an option to forward this invitation to another device or party (such as to the invitee's laptop computer as opposed to the illustrated telephone device), call-in information for an associated audio and/or video teleconference, etc. Also, if desired, the display 1402 may include sufficient information (e.g., session ID, invitee's user ID, session password, etc.) to allow the user to enter the collaborative session via a device other than the one on which the invitation was received. Any desired information may be presented to the invitee via display 1402 and any desired information may be returned from the invitee(s) to the initiator or to the computer system running the session without departing from this invention.

The user and his or her invitees need not access the collaborative sessions through the same website or interface portal. For example, one user may access the session through the manufacturer's or retailer's website while an invitee to that same session may access the session through a social networking website, an email management website, mobile devices, in-store or in-mall kiosks, video games, or any other desired website or application that will allow access to and support the session (e.g., the same website or application over which the invitation was initially received).

Figure 15:
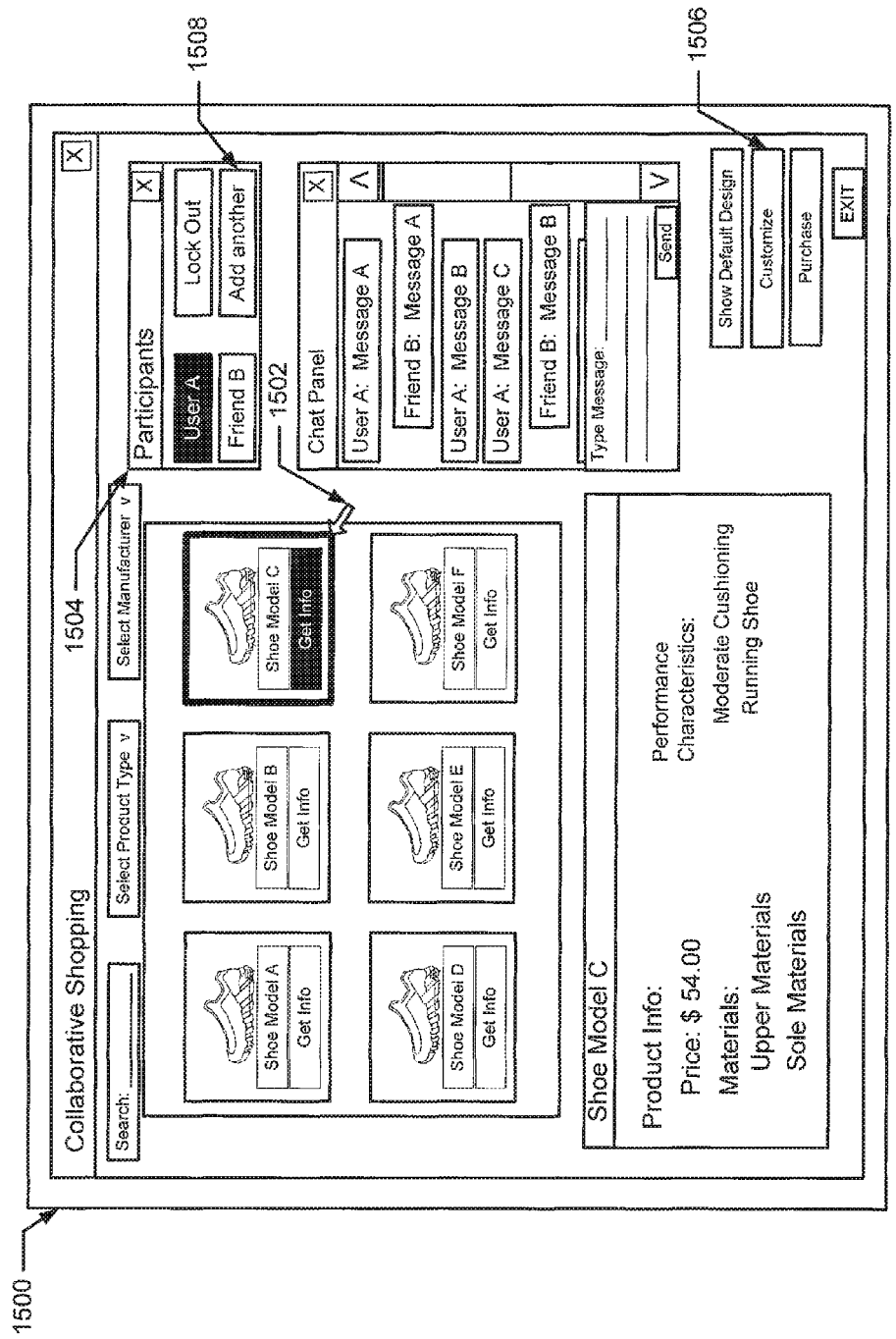
FIGS. 15 and 16 illustrate various example features and functionality of on-line collaborative shopping systems, methods, and user interfaces in accordance with examples of this invention.
Figure 16:
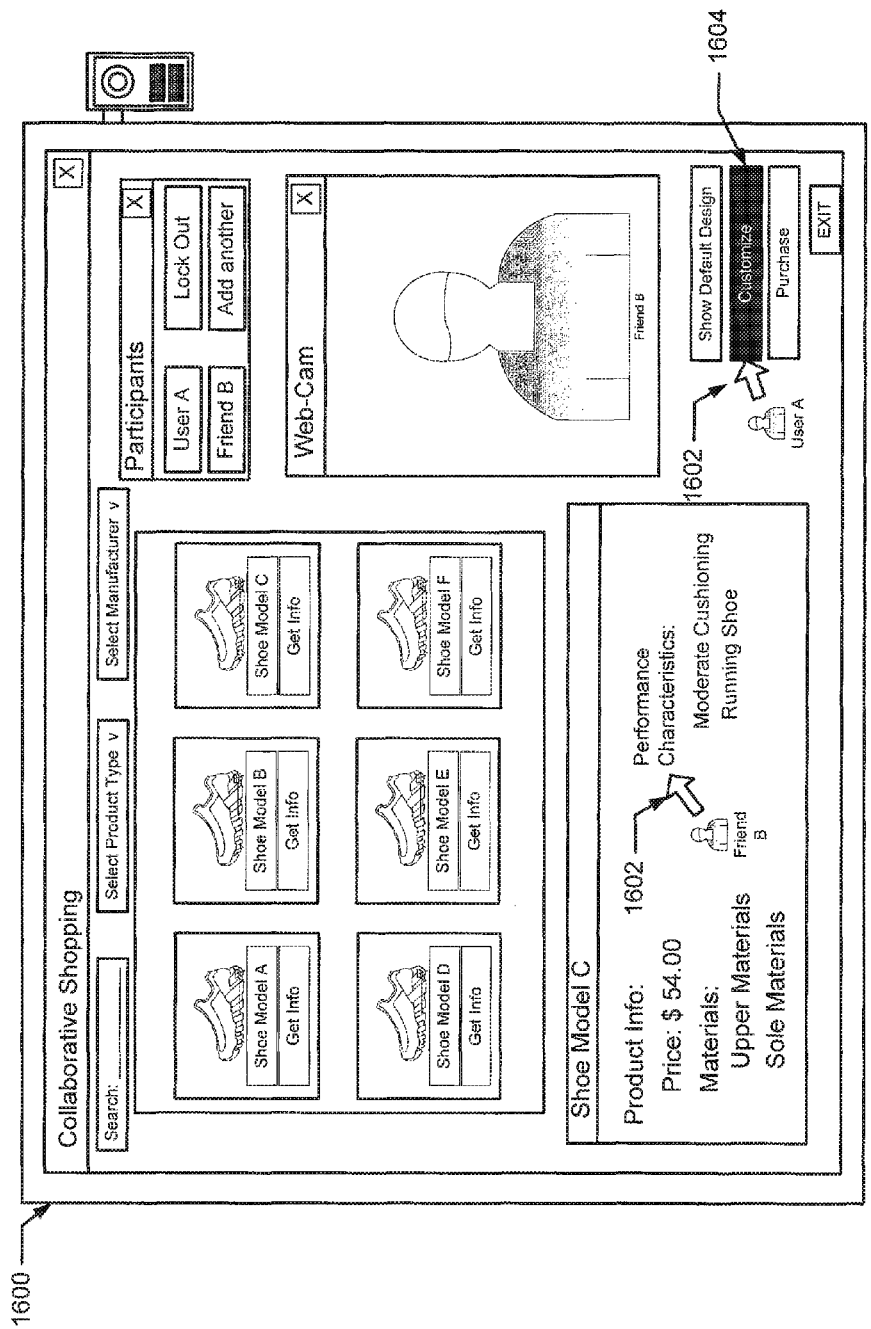

The collaborative shopping systems, methods, and/or user interfaces may include any of the desired features and functionality as described above for the collaborative design systems, methods, and user interfaces, e.g., including the features shown and described above in conjunction with FIGS. 7-11. FIGS. 15 and 16 illustrate some example features of collaborative shopping features in accordance with examples of this invention. FIG. 15 shows an interface 1500 in which a single user at a time has input control (e.g., via pointing device 1502 or other features of the interface 1500), and the "Participants" panel 1504 indicates the user in control. This interface 1500 also includes text messaging user communication features, e.g., as described above. This interface screen 1500 further includes the capability of launching a customization process (e.g., via icon 1506), which, if desired, could automatically set up a collaborative design and customization session with the parties already involved in the collaborative shopping session, e.g., design and customization sessions of the types described above.

This illustrated example system, method, and user interface also provides the capability to invite another party to join the collaborative shopping session, e.g., through a collaborating party's interaction with an "Add Another" icon 1508. Interaction with this icon 1508 may initiate another invitation procedure, e.g., like that described above in conjunction with FIGS. 13 and 14, or any other desired interface feature. If desired, systems, methods, and user interfaces in accordance with at least some examples of this invention may limit the capability to add another user to the collaborative session only to the user that initially set up the shopping session (or a user designated as the "controller" of the session).

As another example, FIG. 16 shows an interface 1600 in which multiple users in the session have input control (e.g., via pointing devices 1602 or other features of the interface 1600), and the pointing devices 1602 indicate the user in control thereof. This interface 1600 also includes audio and/or video user communication features, e.g., as described above. This interface screen 1600 further includes the capability of launching a customization process (e.g., via icon 1604), which, if desired, could automatically set up a collaborative design and customization session with the parties already involved in the collaborative shopping session.

Many variations on the various systems, methods, and user interfaces and uses thereof are possible without departing from this invention. While the above description indicates that the various user interface screens involved in a collaborative session may see the same views or substantially the same views at all times, this is not a requirement. For example, to prevent cluttering up the screen of the various collaborators, each user may be free to change his or her display to work on a feature of the design and then any changes entered to the design may be transmitted to the other users, who will only see the newly inserted change in whatever view they currently have available on their screen. Additionally or alternatively, if desired, an "on-demand" way to synchronize the screens of the users may be provided (e.g., through an appropriate "Synchronize" icon or other interface element) to change all session participant's views to the same view, so that all will be seeing the same thing and talking about the same features on the design. Also, as noted above, individual user's interactions with interface elements in making design changes (such as drop down menus, graphic insertion interfaces, etc.) need not be displayed for viewing by all parties involved in the session (particularly if multiple users are able to simultaneously input design changes). Other ways of controlling the content of the various individual display devices involved in a collaborative session may be provided without departing from this invention.

Other options for systems, methods, and user interfaces also may be made available. For example, users could set up team challenges or "design battles." Through the "sharing" feature (or in some other manner), these teams may ask for input from other users regarding the various designs (e.g., vote for your favorite, etc.) to see who "wins" the contest. Designs also may be posted to the public (or a smaller group), optionally with a request for input or suggestions for improvements. Users also could start with an initial design made by another (e.g., posted using the "sharing" feature), change that design as desired (optionally during a collaborative session or individually), and return a suggested revised design back the original design creator(s) (or others). Aspects of this invention also may allow one user to send a design to another party, e.g., by email, through a website link, etc.

Members of a team may be involved in design sessions in which a common team shoe will be designed, optionally including various features like the team name, logo, player's names, player's positions, etc. As another example, if desired, aspects and features of this invention may be employed or used in conjunction with a "team" look "builder" for outfitting an entire team (or at least some portions thereof). As some more specific examples, a team coach or uniform designer could be provided with a disk or access to a website that "walks" them through the procedure to shop for and/or design a consistent look for an entire team, such as a baseball team, basketball team, football team, hockey team, soccer team, lacrosse team, etc. An on-line expert, other team members, or the like may participate in the shopping and/or designing session using the collaborative systems, methods, and user interfaces in accordance with this invention, e.g., as described above. For example, for a baseball team, the disk or website may walk the user through a procedure in which shoes, pants, jerseys, stirrups, gloves, batting gloves, hats, catching equipment, bats, balls, duffel bags, and the like are designed and/or purchased for the entire team. The particular design choices may include, for example, color of various items; sizes and relative sizes of various items; inclusion of logos, logo positioning, and logo sizes; names; color schemes; make, model, and/or style of various items of footwear, apparel, and/or equipment etc. As noted above, the user may consult on-line experts or others through the collaboration systems and methods according to this invention.

Additional example features of systems, methods, and user interfaces in accordance with this invention relate to collaborative design sessions with experts. For example, to get inspiration or to get a user started in product design, one or more users could be invited to watch an expert design a product, such as an article of footwear, using collaborative systems, methods, and computer interfaces in accordance with examples of this invention. The parties involved in or allowed access to this design session may be allowed any desired level of interaction with the expert, including "view only" rights, viewing rights with some level of communication rights with the expert, complete interactive designing and communication rights with the expert, etc. The experts may use sessions of this type to provide a tutorial on design and their inspiration and/or thought processes when creating a new design. The experts also may interact with their audience and make design changes based on audience input (e.g., akin to an "improvisational" design session in which the expert takes audience suggestions and uses that as inspiration in creating the design on the fly).

As another potential feature, systems, methods, and user interfaces in accordance with at least some examples of this invention relate to collaborative design sessions with a celebrity. As one more specific example, a contest may be arranged (e.g., a product design contest) wherein the prize would be an opportunity to interact with and/or create a new product design with a celebrity using collaborative design systems, methods, and user interfaces in accordance with this invention. Any type of celebrity may be the "co-designer," such as a famous athlete, a television or movie star, a local celebrity, etc. Additionally or alternatively, other users may be invited to watch a celebrity design a shoe (or other product) using collaborative design systems, methods, and user interfaces in accordance with this invention, e.g., with viewing rights only, and then the public (or optionally only those involved in the session) may be given an opportunity to purchase the celebrity designed product (optionally after making their own desired design changes). A wide variety of potential contests and interactions between parties are possible using collaborative design systems, methods, and user interfaces in accordance with this invention.

Those skilled in the art will readily appreciate that the systems, methods, and/or computer interface features described above in conjunction with design and/or shopping for articles of footwear also may be used and/or practiced in conjunction with design of and/or shopping for other products, such as apparel (including athletic apparel, uniforms, etc.) and athletic equipment (such as balls, bats, gloves, bags, protective equipment, team gear, pads, hockey sticks, watches, socks, etc.).

V. Conclusion

While the invention has been described with respect to specific examples including presently preferred modes of carrying out the invention, those skilled in the art will appreciate that there are numerous variations and permutations of the above described systems and techniques may be made without departing from this invention. For example, the systems, methods, and/or user interfaces may include more, less, and/or different functionality from that described above, and the various features of the systems, methods, and/or user interfaces may be activated or interacted with in various different manners (e.g., using different types of interface elements) from those described above. Also the various process steps may be changed, changed in order, some omitted, and/or include additional steps or features without departing from this invention. Various changes and modifications to the systems, methods, and user interfaces may be made without departing from the spirit and scope of the invention, as set forth in the appended claims.

What is claimed is:

1. A non-transitory computer readable medium storing executable instructions that, when executed, cause an apparatus at least to perform:
   displaying a first user interface on a first display device of a first computing system to a first user;
   generating an output that includes data to enable a second user to join a collaborative design session with the first user;
   receiving input indicating a selection of a base article of footwear from either the first user or the second user;
   receiving a first footwear design input generated by a first user, the first footwear design input indicating a first modification to the base article of footwear;
   receiving a second footwear design input generated by a second user, the second footwear design input indicating a second modification to the base article of footwear; and
   upon receiving both the first footwear design input generated by the first user and the second footwear design input generated by the second user at the same time, modifying an appearance of the base article of footwear on the first display device to reflect the first modification and the second modification.

2. The non-transitory computer readable medium of claim 1, wherein the executable instructions, when executed, cause the apparatus to perform:

displaying at least a first communication element on the first user interface.

3. The non-transitory computer readable medium of claim 2, wherein the first communication element includes a text message panel displayed on the first user interface.

4. The non-transitory computer readable medium of claim 2, wherein the first communication element includes a webcam display panel displayed on the first user interface.

5. The non-transitory computer readable medium of claim 1, wherein the executable instructions, when executed, cause the apparatus to perform:
displaying a communication indicating an anticipated effect on a first performance characteristics of the base article of footwear.

6. The non-transitory computer readable medium of claim 1, wherein the second user operates a second computing system that differs from the first computing system, and wherein the executable instructions, when executed, cause the apparatus to perform:
exchanging data between the first computing system and the second computing system over a networked connection.

7. The non-transitory computer readable medium of claim 1, wherein the second user operates a second computing system that differs from the first computing system, and wherein the executable instructions, when executed, cause the apparatus to perform:
exchanging data between the first computing system and the second computing system over an internet connection.

8. The non-transitory computer readable medium of claim 1, wherein the second user operates a second computing system that differs from the first computing system, and wherein the executable instructions, when executed, cause the apparatus to perform:
exchanging data between the first computing system and the second computing system in a peer-to-peer manner.

9. The non-transitory computer readable medium of claim 1, wherein the second user operates a second computing system that differs from the first computing system, and wherein the executable instructions, when executed, cause the apparatus to perform:
exchanging data between the first computing system and the second computing system through a common server that is separate from and in operative communication with each of the first computing system and the second computing system.

10. The non-transitory computer readable medium of claim 1, wherein the displayed first user interface includes a display panel indicating whether the first user, the second user, or another user has footwear design input control, and wherein the first footwear design input and the second footwear design input can be received only from a single user at a time.

11. The non-transitory computer readable medium of claim 1, wherein the displayed first user interface includes a display portion including a rendering of at least a portion of the base article of footwear, and wherein at least a first pointer element is displayed in the first user interface.

12. The non-transitory computer readable medium of claim 11, wherein the displayed first user interface displays a plurality of pointer elements.

13. The non-transitory computer readable medium of claim 12, wherein the display of the plurality of pointer elements on the first display device includes an indicator of which user is in control of each pointer element of the plurality of pointer elements.

14. The non-transitory computer readable medium of claim 11, wherein the display of the first pointer element on the first display device includes an indicator of which user is in control of the first pointer element.

15. The non-transitory computer readable medium of claim 1, wherein the first footwear design input includes data relating to at least one of the following: a color of a portion of the base article of footwear; pictorial or graphic data; pictorial or graphic location data; pictorial or graphic size data; logo data; logo location data; logo size data; logo color data; a material for a portion of the base article of footwear; textual data; textual location data; textual size data; and textual color data.

16. The non-transitory computer readable medium of claim 1, wherein the second user operates a second computing system that differs from the first computing system, wherein the second computing system includes a second display device, and wherein an appearance of the base article of footwear on the second display device at a first time is the same as an appearance of the base article of footwear on the first display device at the first time.

17. The non-transitory computer readable medium of claim 1, wherein the second user operates a second computing system that differs from the first computing system, wherein the second computing system includes a second display device, and wherein the base article of footwear is shown on both the first and second display devices at a first time with a common color pattern and common orientation.

18. The non-transitory computer readable medium of claim 1, wherein the second user operates a second computing system different from the first computing system, wherein the executable instructions, when executed, cause the apparatus to perform:
displaying at least a first communication element on the first user interface, and wherein the first communication element presents communications from the second user to the first user.

* * * * *